United States Patent [19]
Rosheim

[11] Patent Number: 5,967,580
[45] Date of Patent: *Oct. 19, 1999

[54] ROBOTIC MANIPULATOR

[75] Inventor: Mark E. Rosheim, St. Paul, Minn.

[73] Assignee: Ross-Hine Designs, Incorporated, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/978,192

[22] Filed: Nov. 25, 1997

Related U.S. Application Data

[63] Continuation of application No. 08/525,395, Sep. 8, 1995, abandoned, which is a continuation-in-part of application No. 08/497,199, Jun. 30, 1995, abandoned.

[51] Int. Cl.⁶ .................................................... B66C 3/16
[52] U.S. Cl. .............................. 294/88; 294/106; 414/5; 901/29; 901/37
[58] Field of Search ................................ 414/2, 4, 5, 729; 901/30, 31, 32, 29, 37; 623/57, 64; 294/88, 106, 111; 212/238, 261

[56] References Cited

U.S. PATENT DOCUMENTS

| | | |
|---|---|---|
| 3,631,737 | 1/1972 | Wells . |
| 3,722,706 | 3/1973 | Blonsky ............................... 212/261 X |
| 4,046,262 | 9/1977 | Vykukal et al. . |
| 4,068,763 | 1/1978 | Fletcher et al. . |
| 4,626,164 | 12/1986 | Chang ...................................... 414/735 |
| 4,641,251 | 2/1987 | Inoue ....................................... 364/513 |
| 4,683,773 | 8/1987 | Diamond .................................. 74/479 |
| 4,736,826 | 4/1988 | White et al. ........................... 191/12.4 |
| 4,780,047 | 10/1988 | Holt et al. ............................... 414/730 |
| 4,821,594 | 4/1989 | Rosheim ............................ 294/106 X |
| 4,834,761 | 5/1989 | Walters ..................................... 623/26 |
| 4,883,400 | 11/1989 | Kuban et al. ............................... 414/2 |
| 4,911,033 | 3/1990 | Rosheim et al. .......................... 74/479 |

*Primary Examiner*—Donald W. Underwood
*Attorney, Agent, or Firm*—Kinney & Lange, P.A.

[57] ABSTRACT

A pair of connected joints in a master-slave robotic system each operated by a plurality of force imparting means. Such force imparting means for the second joint imparts force thereto at an acute angle. A third joint is used with a flexible drive tape partly internal thereto. A gripping system having an orthogonally rotatable base effector is supported by this joint using a pair of linear actuators to position the base effector as desired. A counterpart system having an orthogonally rotatable base follower orthogonally rotatable on a pair of linear actuators uses the actuators to null out forces occurring thereon.

15 Claims, 16 Drawing Sheets

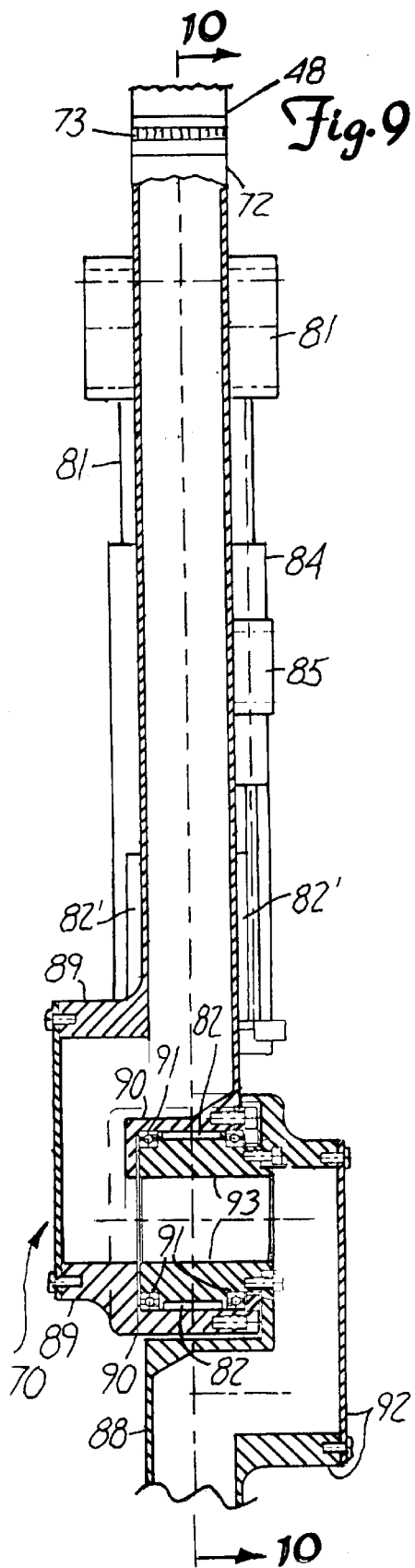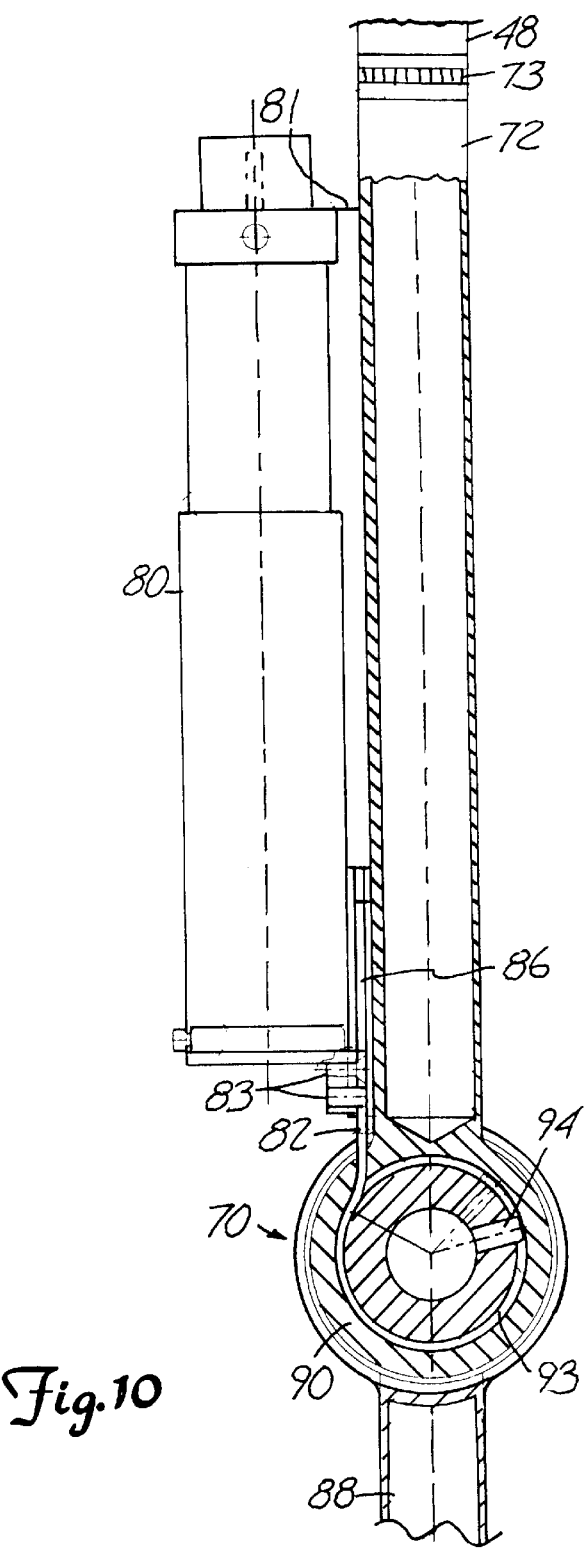

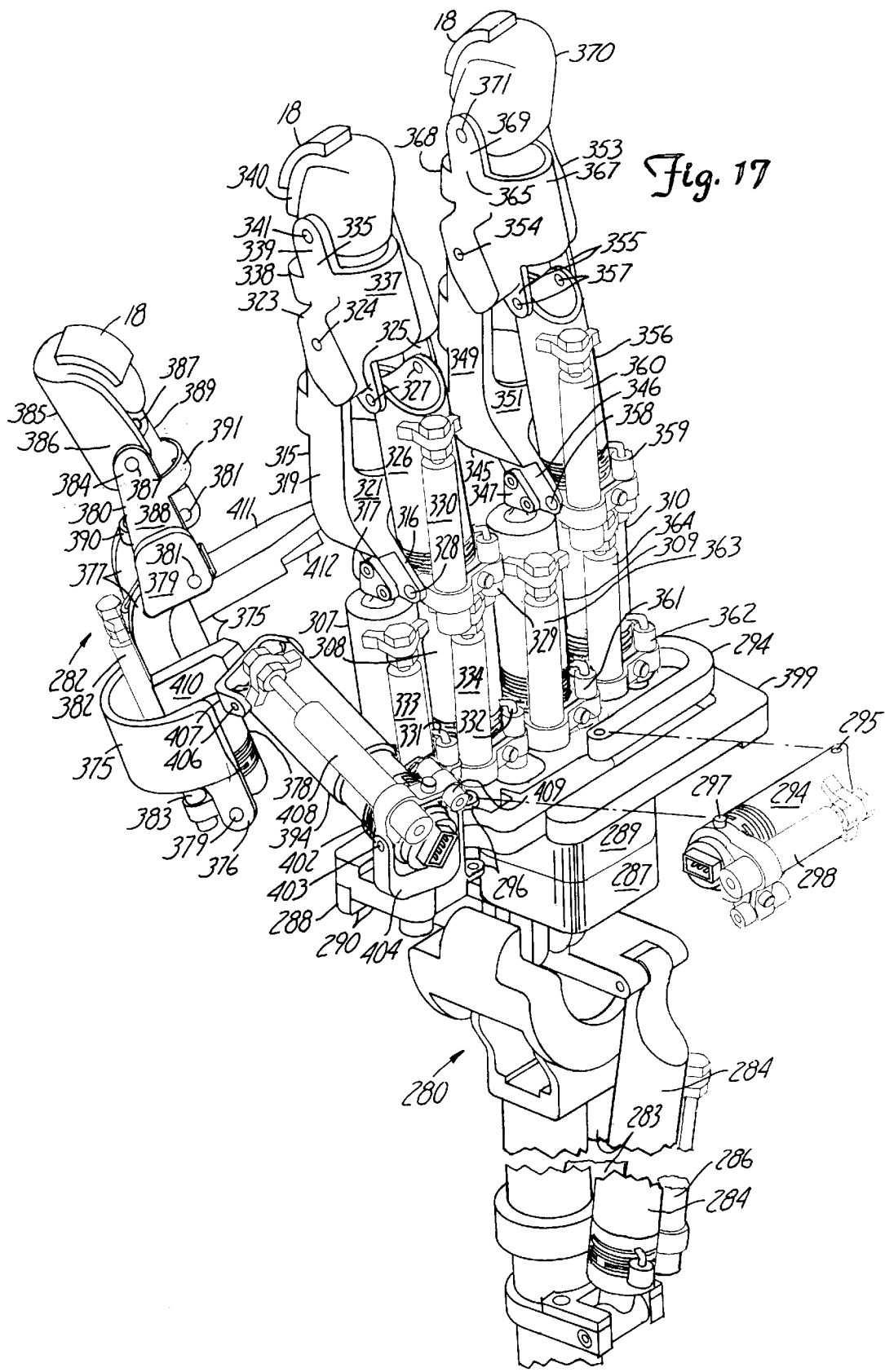

ശ്രീ5,967,580

ROBOTIC MANIPULATOR

This is a continuation of application Ser. No. 08/525,395, filed Sep. 8, 1995, now abandoned, which is a continuation-in-part of application Ser. No. 08/497,199, filed Jun. 30, 1995 now abandoned.

BACKGROUND OF THE INVENTION

The present invention relates to controlled motion mechanical members used as a mechanical manipulator and, more particularly, to a motion controllable, anthropomorphic mechanical manipulator providing some of the capabilities of an upper human torso.

A need for increased automation in the workplace, especially in those workplace environments unsuitable for humans, and a desire to increase the use of animated figures depicting humans or other characters often in entertainment situations, has led to substantial efforts in the development of robotics. As a result, substantial advances have occurred in many aspects of robotics.

An important aspect in robotics is the controlling of mechanical manipulators, the portion of a robot used to change the position or orientation of selected objects. In may instances, such manipulators are desired to have motion capabilities similar to those of a human chest, shoulder, arm, wrist and hand, or portions thereof.

Providing a mechanical manipulator simulating such portions of the human torso presents a difficult design problem. The chest and back portions of a human supporting a shoulder blade can be considered to have two degrees-of-freedom in motion possibilities available to it, and the shoulder ball and socket joint supporting the arm can be considered to have three degrees-of-freedom in motion possibilities available to it. In addition, the elbow can be considered to have a single degree-of-freedom in its possible motion and the wrist can be considered to have three degrees-of-freedom in motion possibilities available for it. Finally, the human palm can be considered to have a degree-of-freedom in its relative motion possibilities while the fingers and thumb thereon can be considered to have four degrees-of-freedom in the motion possibilities thereof.

A number of mechanical joints or mechanical manipulators have been proposed which attempt to exhibit the motion possibilities of the corresponding human joints, and some of these proposals have actually achieved corresponding capabilities to a significant degree. These joints typically have a base on which one side of the joint is fastened, and from which a force imparting arrangement is provided to operate movable members in this fastened portion of the joint. Mechanical transmission arrangements then couple this motion on this fastened side of the joint to the controlled side of the joint to cause that portion to correspondingly move.

However, such joints have often been constructed using a substantial number of parts causing significant expense, and with the result that they are often difficult to assemble. Further, such joints often fail to have the controlled portion thereof exhibit the desired dexterity and range of motion. In addition, the construction have often exhibited bulky geometries which do not appear much like those of the human counterparts. Also, control of the controlled side of the joint has often been insufficient in the operator not having convenient controlling arrangements available. Thus, there is desire to joint arrangements overcoming such deficiencies so that a human look-alike upper torso and arm mechanical manipulator can be provided with motion possibilities substantially equivalent to that of the upper human torso and arm.

SUMMARY OF THE INVENTION

The present invention provides a pair of connected joints and force imparting means therefor especially suitable for use in anthropomorphic master-slave robotic system. The force imparting means for the second joint imparts force thereto at an acute angle with respect to the connection between the two joints. A third joint is operated by a flexible tape passing through one joint member to operate the other.

Beyond the third joint is supported a structure having a frame with an extension to which a base effector is rotatably connected to be rotatable in orthogonal directions along with a pair of linear actuators each rotatably connected to that extension on either side of where the base effector is connected and each rotatably connected to the base effector on either side of where the extension is connected thereto. A counterpart structure for controlling this first structure omits the connection between such a frame and base effector of the first structure while keeping the actuator connections to each, and provides means for engaging the controlling operator's hands.

BRIEF DESCRIPTION OF THE DRAWINGS

FIG. 9 shows a cross section view of the structure shown in FIG. 6;

FIG. 10 shows a cross section view of the structure shown in FIG. 9;

FIG. 17 shows an alternative pictorial view of the structure shown in FIG. 11;

DETAILED DESCRIPTION OF THE PREFERRED EMBODIMENTS

Figure 1:
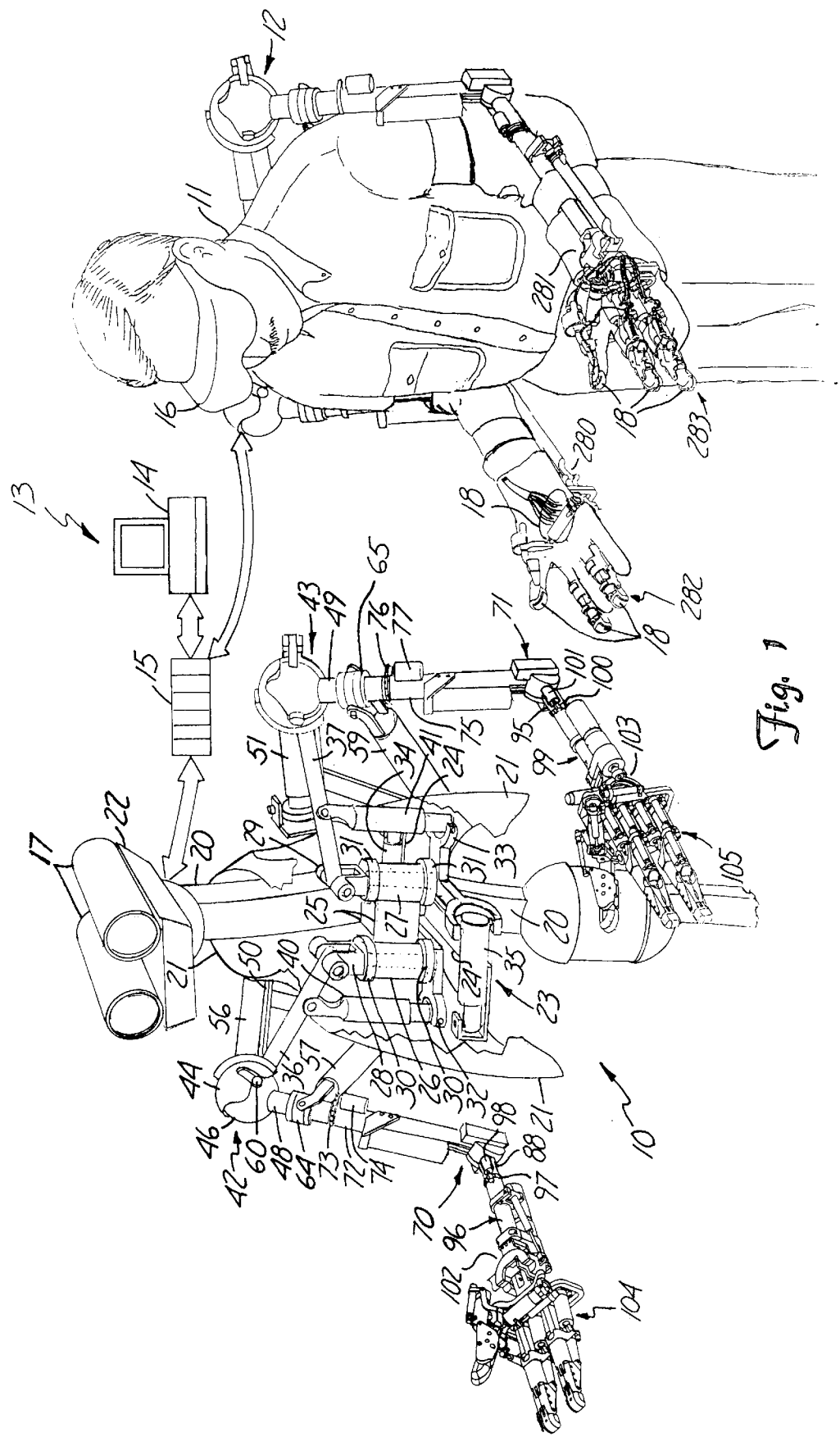
FIG. 1 shows a pictorial view of a master-slave robot and robotic control arrangement embodying the present invention.

FIG. 1 shows a master-slave robot and robotic control arrangement in which a slave robot, 10, is under the control of a human operator, 11, through having externally mounted on the upper torso, arms and hands of that operator, a master robotic control apparatus, 12. This control apparatus may be termed an "exoskeleton" in its being mounted about the exterior of the upper portion of that operator's body.

Control exoskeleton 12, in being attached to the operator's upper torso, arms and hands, senses each motion of these bodily parts of the operator and transmits signals carrying such information from a transmitter therein not seen in FIG. 1, to a control arrangement, 13. Control arrangement 13 is operated under the direction of a computer, 14, which controls operation of a system controller, 15. Operator 11, or another, can impose further control measures on the system through computer 14 such as setting system parameter values, etc. Controller 15 has a receiver therein to receive transmissions from the transmitter in control exoskeleton 12, and has a transmitter therein to send information signals to a receiver in control exoskeleton 12 also not shown.

Similarly, controller 15 has a transmitter therein to transmit information signals to a receiver in slave robot 10, again not separately shown but indicated to be in a portion of that robot somewhat reminiscent of a human head. This portion of slave robot 10 also has a transmitter therein for transmitting information signals to controller 15 which has a further receiver to receive same therein. Wiring arrangements are provided through the joints and joint connectors in both slave robot 10 and control exoskeleton 12 to distribute signals obtained from the receivers therein to the actuators therein intended to respond to them, and to collect signals from sensors therein to be brought to the transmitters therein.

Control exoskeleton 12, in receiving signals from controller arrangement 13, uses the information in those signals to operate actuators therein to aid human operator 11 in moving the exoskeleton apparatus to the extent desired by that operator. The signals received in exoskeleton 12 from control arrangement 13 are used to move the corresponding actuators therein sufficiently to null out force magnitude signals measured by force sensors thereon due to forces imposed by bodily motions of human operator 11 which force signals (and some translation magnitude signals) are transmitted to control arrangement 13. These bodily motion based force magnitude signals (and some translation magnitude signals) are also used by control arrangement 13 to cause similar motions by similar actuators in slave robot 10 through control arrangement 13 transmitting similar signals intended for those actuators to slave robot 10.

Such sensed signals from slave robot 10 to control arrangement 13 may include video signals subsequently transmitted by control arrangement 13 to a video display arrangement within a visor, 16, worn by operator 11 which convey thereto the information obtained by video cameras in slave robot 10 such as those at the top thereof designated 17. Also, the actuator signals received in control exoskeleton 12 from control arrangement 13 convey tactile force information which signals are distributed to tactile force actuators, 18, capable of applying force to operator 11 at locations in which they are provided. These locations are in the hand-like portions of control exoskeleton 12, both in the finger-like portions where the tactile actuators are built in and in a palm portion where the tactile actuators are provided in a glove fitted over the operators hand.

A basic motion to be simulated by slave robot 10 using the upper human torso movement simulation capability thereof is the ability of a human body to position its shoulders with respect to its rib cage and spine. That is, humans can throw their shoulders back or hunch them forward. As a basis for this simulation, slave robot 10 is provided with a human spine-like base, 20, which is seen more clearly in FIG. 2. The structure and actuators for simulating this motion are supported by base 20 and housed within a rib cagelike shroud, 21, shown partly removed in FIG. 2 to avoid obscuring structures within the interior thereof. Base 20 also supports a human head-like arrangement, 22, at its top containing control circuitry and supporting cameras 17.

This structure and these actuators for this shoulder motion simulation are provided in an interior joint arrangement, 23, that is supported on base 20 by two support structure plates, 24 and 25, affixed thereto. These plates are seen in a plan view showing a portion of the FIG. 2 structure in FIG. 3. Structure 25 supports a pair of rotary bases, 26 and 27, each rotatably supporting a spindle of one of a pair of corresponding forks, 28 and 29. The spindles of each of forks 28 and 29 can rotate within its corresponding one of rotary bases 26 and 27 along a vertical axis in FIGS. 1 and 2, i.e. along a axis extending in the general direction of spine-like structure or base 20. Rotary bases 26 and 27 support forks 28 and 29 while permitting them to rotate therein by having each corresponding fork spindle mounted in a pair of preloaded conical bearings, 30 and 31, with each of the bearing members of a pair being located on an opposite end of its corresponding one of rotary bases 26 and 27. The inner bearing races are affixed to the ends of the spindles of the forks, and the outer bearing races are affixed to the walls or rotary bases 26 and 27 at the opposite ends thereof.

The lower end of the spindle of fork 28 is fixedly attached to a bent, common shank, double clevis, 32. Similarly, the lower end of fork 29 is fixedly attached to another bent, common shank double clevis, 33. These double clevises are each driven by a corresponding linear actuator connected thereto and mounted on support structure 24. A first of these linear actuators, 34, is mounted on support structure 24 and rotatably connected in a clevis provided at one end of double clevis 32 by a pin. The other end of linear actuator 34 is connected through a pin to support structure 24 to be rotatably connected thereto. Similarly, a further linear actuator, 35, is connected by a pin to a clevis structure at an end of double clevis structure 33 to be rotatably connected thereto, and the other end of linear actuator 35 is connected by a pin to support structure 24 to be rotatably connected thereto.

The upper end of fork 28, opposite its end connected to double clevis 32, has the two branches thereof forming a forked end rotatably connected by a pin to a tubular joint support, 36. In a like manner, the upper end of fork 29, opposite its end connected to double clevis 33, has the two branches thereof forming a forked end rotatably connected through a pin to another tubular joint support, 37. The opposite end of tubular joint support 36 has affixed to it a support bracket, 38, supporting a ball-and-socket joint corresponding to a human shoulder joint as will be described below. This is also true of tubular joint support 37 which has affixed to it a further bracket, 39, to support another ball-and-socket joint again corresponding to a human shoulder joint.

Figure 3:
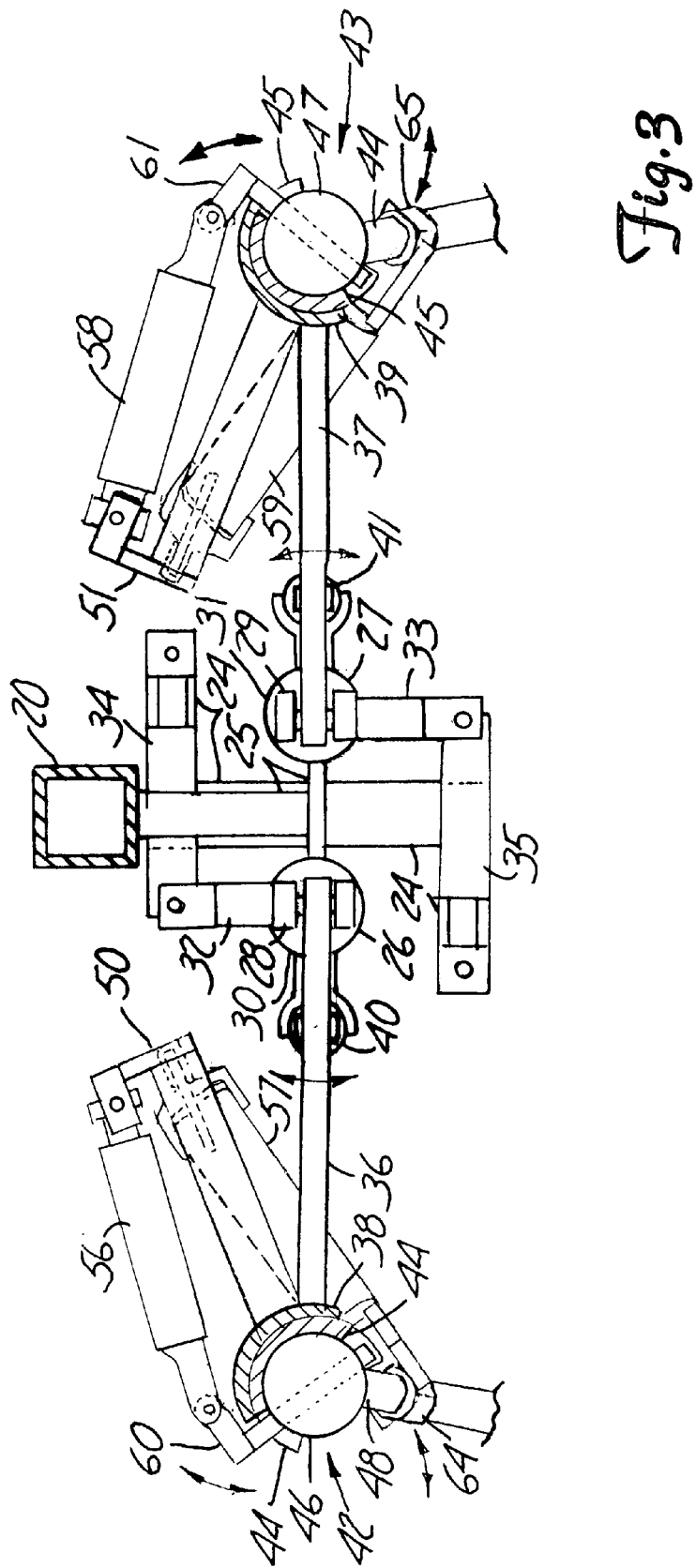
FIG. 3 shows a plan view of a portion of the structure shown in FIG. 2.

Thus, as can be seen in FIG. 3, if linear actuator 34 elongates, double clevis 32 will cause fork 28 to rotate in rotary base 26 thereby forcing tubular joint support 36 and the ball-and-socket connected thereto to rotate counterclockwise, and with rotation of the ball-and-socket joint held by bracket 38 occurring in the opposite direction for a shortening of linear actuator 34. Similarly, any elongation of linear actuator 35 will cause double clevis 33 to rotate counterclockwise to thereby force fork 29 to rotate in rotary base 27 and thus force tubular joint support 37 and bracket 39 to rotate counterclockwise along with the ball-and-socket joint connected thereto. A shortening of linear actuator 35 will produce a rotation of that latter ball-and-socket joint in the opposite direction. Thus, slave robot 10 can emulate a human throwing his or her shoulders backward or forward by operation of linear actuators 34 and 35 to operate joint arrangement 23.

Any such rotation of double clevis 32 results in moving a further linear actuator, 40, as part of the same rotation because of the rotatable connection of the other clevis in double clevis 32 to linear actuator 40. A similar result is achieved by linear actuator 35 rotating double clevis 33 to carry along in that rotation another linear actuator, 41, rotatably connected to the remaining clevis in double clevis 33. Linear actuator 40 has its opposite end rotatably connected to tubular joint support 36 at approximately a third of the length of that support away from its connection to fork 28. Linear actuator 41 is similarly connected to tubular joint support 37 at approximately a third of its length away from its connection to fork 29. Thus, operating linear actuators 40 or 41 to extend them up and down results in a motion of the corresponding ball-and-socket joint resembling shrugging motions in human shoulders.

Figure 2:
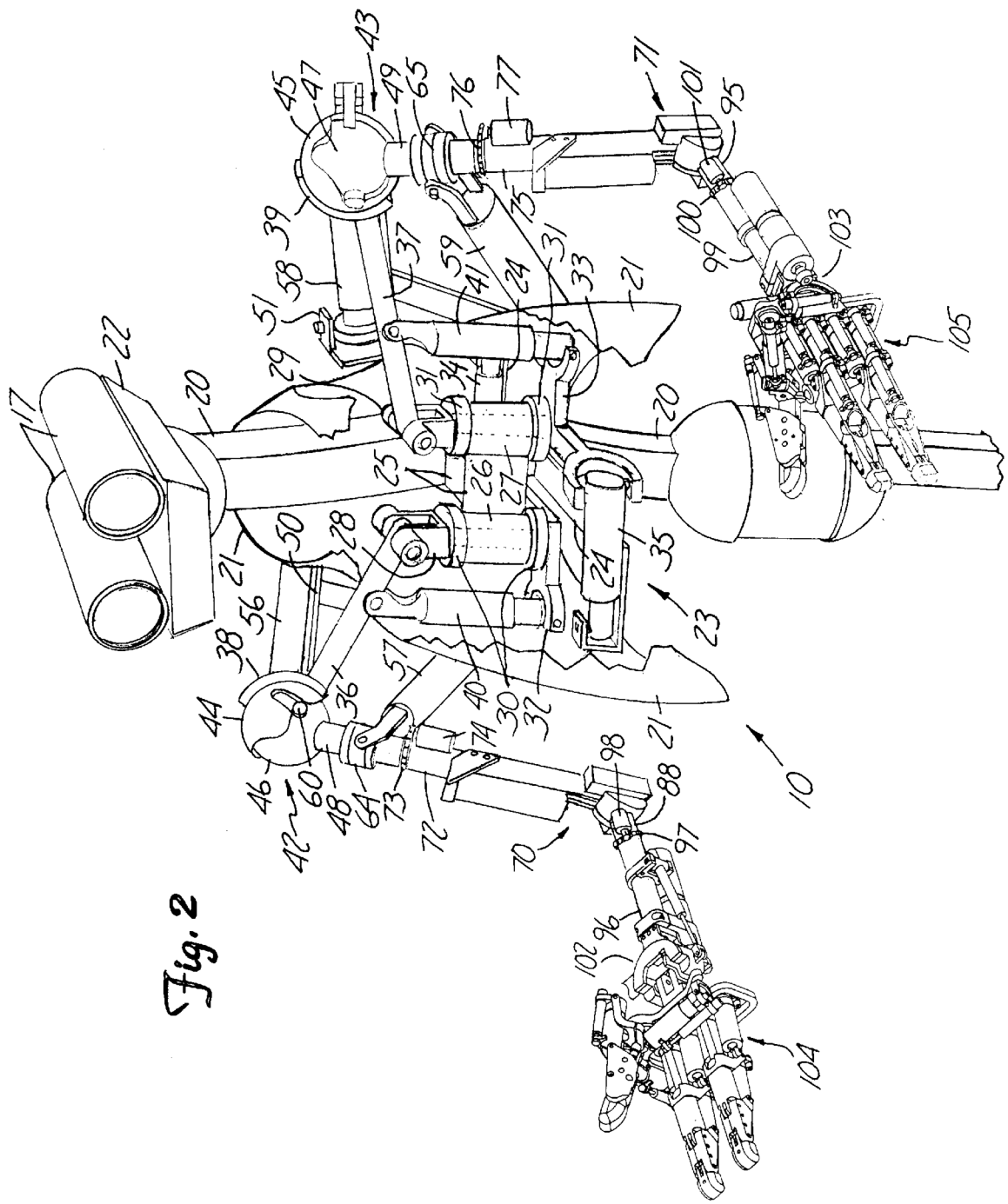
FIG. 2 shows a pictorial view of a slave robot embodying the present invention.

The arrangement used to provide the back and forth motion of the shoulder-like ball-and-socket joints affixed to brackets 38 and 39 is, as described, accomplished by the use of linear actuators as shown in FIGS. 1, 2 and 3. Such a structure results in a very "stiff" arrangement in that forces applied to tubular joints supports 36 and 37 from external sources have relatively little effect in forcing those supports to move back and forth because of the strong resistance of linear actuators 34 and 35 to changing length due to external forces. However, other and simpler arrangements can be used for shoulder motion simulation joint 23 which may not be as resistant to externally applied forces but which are either cheaper or more convenient. Thus, linear actuators 34 and 35, double clevises 32 and 33, and rotary bases 26 and 27 can be dispensed with and replaced by a pair of side-by-side rotary electrical motors supported by a mount to base 20. The output shafts of these motors have forked ends connected to tubular joint supports 36 and 37 as before, and also have thereon support brackets thereon extending therefrom down the sides of the motors and then underneath linear actuators 40 and 41 to thereby support them and rotate them. Such an arrangement would again allow rotating the shoulder-like ball-and-socket joints affixed to brackets 38 and 39 to similarly simulate the motion of human shoulders thrown back and forth. Linear actuators 40 and 41 would again be able to move joint supports 36 and 37 up and down with the ball-and-socket joints thereon to simulate the shrugging motion of human shoulders.

A further alternative for shoulder motion simulation joint 23 is to mount a pair support bases on base 20 in place of rotary bases 26 and 27 again dispensing with double clevis 32 and 33 and linear actuators 34 and 35 along with support structure 24, and this time also dispensing with linear actuators 40 and 41. Using these substituted bases, one for each shoulder-like ball-and-socket joint, the joint supports 36 and 37 can each be directed outward in a sideways direction at an angle to the other and base 20, and connected to its corresponding base by an orthogonal pivot structure such as a universal joint. Two outward extending arms on each base, extending in orthogonal directions therefrom, support rotatably connected linear actuators thereon, and the other ends of these actuators are rotatably connected to the facing side of a corresponding one of joint supports 36 and 37 at approximately the midpoint thereof. Tubular joint supports 36 and 37 are again connected by brackets at the ends thereof to the corresponding ball-and-socket joints. Suitably positioning the actuators with respect to base 20 allows one actuator to move the corresponding shoulder-like ball-and-socket joint back and forth, while the orthogonally positioned actuator is allowed to move that ball-and-socket joint up and down.

The ball-and-socket joints simulating shoulder joints of a human that are provided in control exoskeleton 12 worn by operator 11 are joined, although not shown in FIG. 1, by the above described alternative version of joint 23 based on using a pair of electric motors with rotating output shafts to rotate the tubular joint supports front and back in aid of operator 11. This use of such motors in control exoskeleton 12 in a joint having the purpose of joint 23 in slave robot 10 in place of the linear actuator implementation of joint 23 in slave robot 10 shown in FIGS. 2 and 3 is made to reduce the bulkiness of that structure for the comfort of operator 11 during use. The reduced resistance to externally applied forces in such a joint in control exoskeleton 12 is not a concern of the magnitude that it is for the joint 23 arrangement shown in FIGS. 1, 2 and 3 for slave robot 10, and not of the magnitude of the concern there would be for operator 11 if forced to wear an unduly bulky exoskeleton.

As indicated above, a pair of ball-and-socket joints, 42 and 43, are provided at the end of tubular joint supports 36 and 37, respectively, to permit simulating human shoulder joints which are known to be ball-and-socket joints capable of allowing the human arm to rotate therein to thereby make that arm capable of extending in a plurality of directions as can be seen in FIGS. 2 and 3. Ball-and-socket joint 42 is supported by being affixed to bracket 38 which itself is affixed to the end of tubular joint support 36. In a like matter, ball-and-socket joint 43 is supported by bracket 39 affixed thereto and to the end of tubular joint support 37. Specifically, bracket 38 is affixed by screws to a socket, 44, in joint 42. Bracket 39 is also affixed by screws to a socket, 45, in joint 43. This can be more clearly seen in FIG. 4 for joint 42 which is a cross section view of that joint.

Within socket 44, is a substantially hollow ball, 46. Similarly, within socket 45 of joint 43 is a substantially hollow ball, 47. Hollow balls 46 and 47 can rotate about their centers within sockets 44 and 45, respectfully, to a considerable but limited extent by sliding along the interiors surfaces thereof. The limits to such rotation is provided by various protrusions from the balls (to be described below) encountering the terminating edges of sockets 44 and 45. As one such protrusion, hollow ball 46 has affixed thereto a tubular ball extension, 48. This is accomplished in a manner such that a open passageway through this joint exists extending through tubular joint structure 36, through openings in bracket 38 and socket 44, through hollow ball 46, and then out therefrom through tubular ball extension structure 48. This passageway permits electrical wiring to be brought from out of base 20 into the closest end of tubular joint support 36 and out the other end through bracket 38 and ball-and-socket joint 42 into tubular ball extension structure 48. Such wiring is used for controlling further actuators outward therefrom into the remaining structure connected thereto for simulating the human arm, and for collecting sensor information signals generated in such remaining structure.

A similar ball extension structure, 49, extends from hollow ball 47 forming a protrusion from that ball. A similar open passageway for wiring is thus provided is provided for joint 43 extending from the interior of tubular joint support 37, through bracket 39 and socket 45 into hollow ball 47, and then out through tubular ball extension 49. Again, such wiring is used for controlling further actuators outward therefrom into the remaining structure connected thereto for simulating the human arm, and for collecting sensor information signals generated in such remaining structure Motions of ball extensions 48 and 49 are controlled for each by a corresponding pair of actuators mounted on an actuator support bracket. These support brackets are provided at an acute angle with respect to corresponding ones of joints support 36 and 37 such that the orientation of the long direction in these brackets lies more or less along a corresponding axis between it's associated ball-and-socket joint and spine-like structure, or base, 20. This angular arrangement has the effect of keeping the brackets and the pair of actuators supported thereby relatively close into the remaining torso-like structure of slave robot 10 to more easily enable providing additional structure over shroud 21 to protect the existing structure of slave robot 10 or to better simulate a human torso or both.

Ball-and-socket joint 42 has such an actuator support bracket 50, affixed to bracket 38 shown to extend back therefrom in FIG. 3 at an angle of approximately 25° with respect to tubular joint support 36 in that figure. Similarly, an actuator bracket, 51, is shown in FIG. 3 for ball-and-socket joint 43 extending back from bracket 39 to which it is affixed at an angle of approximately 25° with respect to tubular joint support 37. The selection of the value for this angle is based on a tradeoff between keeping the angle small to thereby improve compactness of the structure for slave robot 10, on the one hand, but having the angle large on the other hand so that the actuators supported thereby, generally aligned the major length of the support bracket therefor, retain the capability to force ball extensions 48 and 49 to rotate forward and back perpendicular to the corresponding tubular joint support for that ball-and-socket joint, i.e. to rotate about an axis substantially parallel to the direction of extension of those joint supports. Even more demanding in some situations, such rotations may be required to be directed to some degree inward toward the side of slave robot 10 at which the other ball-and-socket joint is located. The angular range of permitted choices for values of the angular relationships between the actuator support bracket and the tubular joint support in the plane of FIG. 3 is 15° to 75° depending on the strength of the structure, the force which can be generated by the actuator for the ball-and-socket joint responsible for moving tubular extension 48 or 49, and the expected load.

Figure 5:
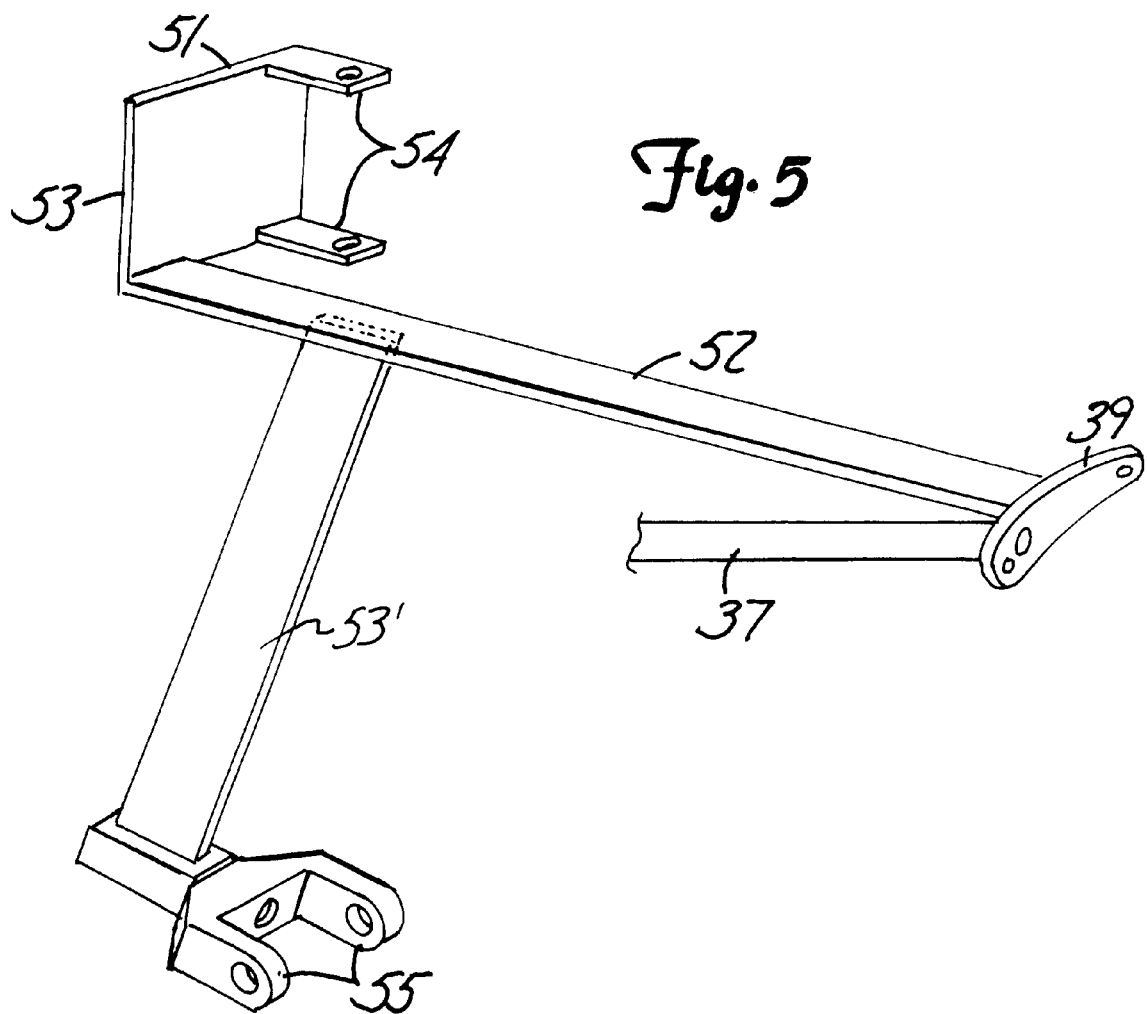
FIG. 5 shows a pictorial view of a portion of the structure shown in FIGS. 2 and 3.

Actuator support bracket 51 is shown in greater detail in FIG. 5 where it can be seen that bracket 39 has both tubular joint support 37 and ball-and-socket joint actuator support bracket 51 affixed thereto. The portion of ball-and-socket joint actuator support bracket 51 affixed to bracket 39 is a long flat bar, 52, which has a clevis support plate, 53, affixed to the other end thereof. Clevis support plate 53 has a pair of branches, 54, forming a basis for a fixed position clevis affixed thereto. In addition, a further clevis support, 53', affixed to bar 52 approximately a quarter of the distance therealong from clevis support plate 53 and approximately two thirds of its length, has rotatably connected to the opposite end thereof a more or less "U" shaped pair of branches and base, 55, forming the basis of a rotatably connected clevis.

Ball-and-socket joint actuator support bracket 50 in FIGS. 2 and 3 has a pair of linear actuators, 56 and 57, rotatably connected in the clevises of that bracket. Linear actuator 56 is rotatably connected at a end thereof to the fixed position clevis of bracket 50, and linear actuator 57 is rotatably connected at a end thereof to the rotatably connected clevis of bracket 50. The length of support plate 53' and the connection point of linear actuator 57 to ball extension 48 (to be described below) results in linear actuator 57 having an axis that in elevation makes an acute angle with the axis of linear actuator 56 to allow actuator 57 to apply more of the force generated thereby to ball extension 48 in forcing it to extend forward and retract backward. That angle seen in elevation should range from 15° to 75° to assure adequate force. Similarly, ball-and-socket joint actuator support bracket 51 has a further pair of linear actuators, 58 and 59, rotatably connected to the clevises therein in a similar arrangement. Linear actuator 58 has one end thereof rotatably connected to fixed clevis 54 of bracket 51, and linear actuator 59 has one end thereof rotatably connected to rotatably connected clevis 55 of bracket 51.

Figure 4:
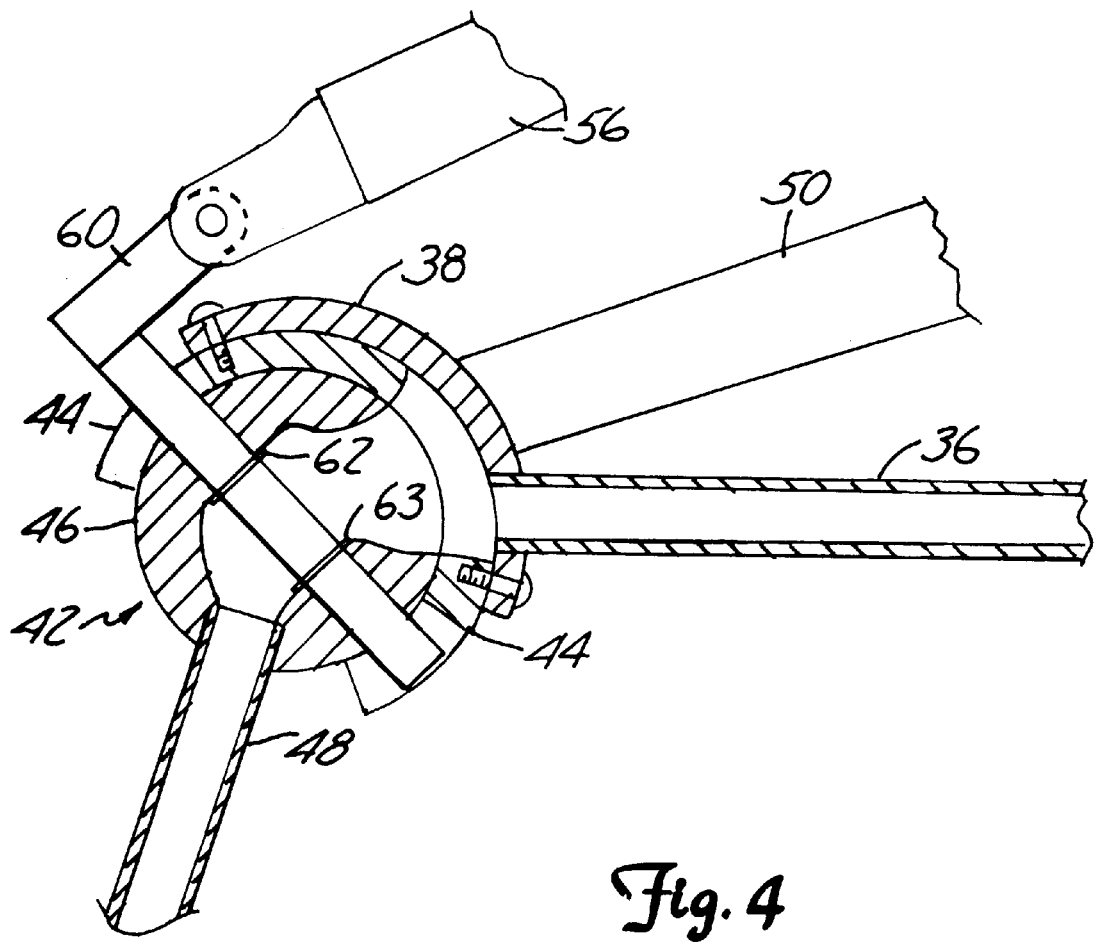
FIG. 4 shows a cross section view of a portion of the structure shown in FIGS. 2 and 3.

Linear actuator 56 is rotatably connected at an end thereof, opposite the one connected to bracket 50, to a bent pin, 60. Pin 60 is bent to approximately a right angle and has the portion thereof past the bend away from its connection to linear actuator 56 extending through slots in socket 44 on opposite sides thereof and through the outer wall of ball 46 twice on opposite sides thereof. As can be seen in FIG. 4, the portion of bent pin 60 extending through ball 46 and through corresponding slots in socket 44 extends through the center of ball 46. The presence of the portion of bent pin 60 past the bend extending through ball 46, but captured in the slots in socket 44, prevents ball 46 from rotations along an axis through the center thereof other than parallel to the axis of that portion of pin 60. Yet, ball 46 can rotate about the axis of the portion of pin 60 therethrough thus allowing tubular ball extension 48 to rotate more or less in and out of the plane of the drawing in FIG. 4 but preventing twisting of that extension about other axes in the plane of that figure. Furthermore, extensions and retractions of linear actuator 56 rotate ball 46 about an axis perpendicular to the plane of FIG. 4 to thus guide the angular orientation of tubular ball extension 48 with respect to tubular joint support 36. This orientation will determine the direction towards which tubular ball support 48 is pointing with respect to tubular joint support 36 when extension 48 is forced up from or into the plane of FIG. 4 by linear actuator 57 to be described below.

A similar bent pin, 61, is rotatably connected to the end of linear actuator 58 opposite that end thereof which is connected to bracket 51, and the portion of bent pin 61 past the bend extends through slots in socket 45 and through the wall of ball 47 twice in a manner similar to bent pin 60. Note in FIG. 4 that bent pin 60 is retained in ball 46 by a pair of retaining rings, 62 and 63, positioned against the walls of ball 46. A similar arrangement is used to retain bent pin 61 in ball 47.

The end of linear actuator 57 not connected to the rotatable clevis in bracket 50 is connected to tubular ball extension 48 through a slip ring arrangement, 64. Slip ring arrangement 64 has an inner bearing race affixed to tubular ball extension 48. An outer bearing race is rotatably connected by pins to a pair of arms extending from linear actuator 57. Needle bearings are used between the inner and outer races of slip ring 64. A similar slip ring, 65, is provided about tubular ball extension 49 for the rotatable connection of linear actuator 59 thereto. The extensions and contractions of linear actuators 57 or 59 force tubular ball extensions 48 or 49 toward or away from the rotatably connected clevises of the corresponding ones of actuator brackets 50 and 51 to thus simulate the motion of a human arm being extended or retracted. The orientation of that extension, is described above, is controlled by linear actuators 56 and 58 in orienting the axis of bent pin 60 and 61, respectfully, to orient the location of corresponding balls 46 and 47.

Below tubular ball extensions 48 and 49 are the structures used to simulate motion of a human forearm about the elbow. The human elbows are simulated by single degree-of-freedom joints in slave robot 10, such a single degree-of-freedom joint, 70, being supported by tubular ball extension 48. Tubular ball extension 49 supports a similar single degree-of-freedom joint, 71. Tubular ball extension 48 supports joint 70 by supporting a tubular joint base, 72, rotatably attached thereto through a pair of bearings having inner races attached to tubular joint base 72 and outer races attached to tubular ball extension 48 which cannot be seen in the drawings. The bottom of tubular ball extension 48 has therearound a set of gear teeth, 73. A motor, 74, affixed to tubular joint base 72 forces that base and motor 74 to rotate within tubular ball extension 48 in the bearings just described through a gear on the output shaft thereof engaged with gear 73. Thus, single degree-of-freedom joint 70 and the apparatus there beyond can be caused to rotate with respect to tubular ball extension 48.

A similar structure is provided in connection with tubular ball extension 49 and single degree-of-freedom joint 71. Tubular ball extension 49 supports a tubular joint base, 75, through a pair of bearings between them not seen in the figures in the same arrangement as used in connection with tubular ball extension 48 and tubular joint base 72. The end of tubular ball extension 49 has a gear therearound, 76, and tubular joint base 75 can be rotated within tubular ball extension 49 and the bearings just mentioned by a motor, 77, through a gear on the output shaft thereof engaged with gear 76.

Figure 6:
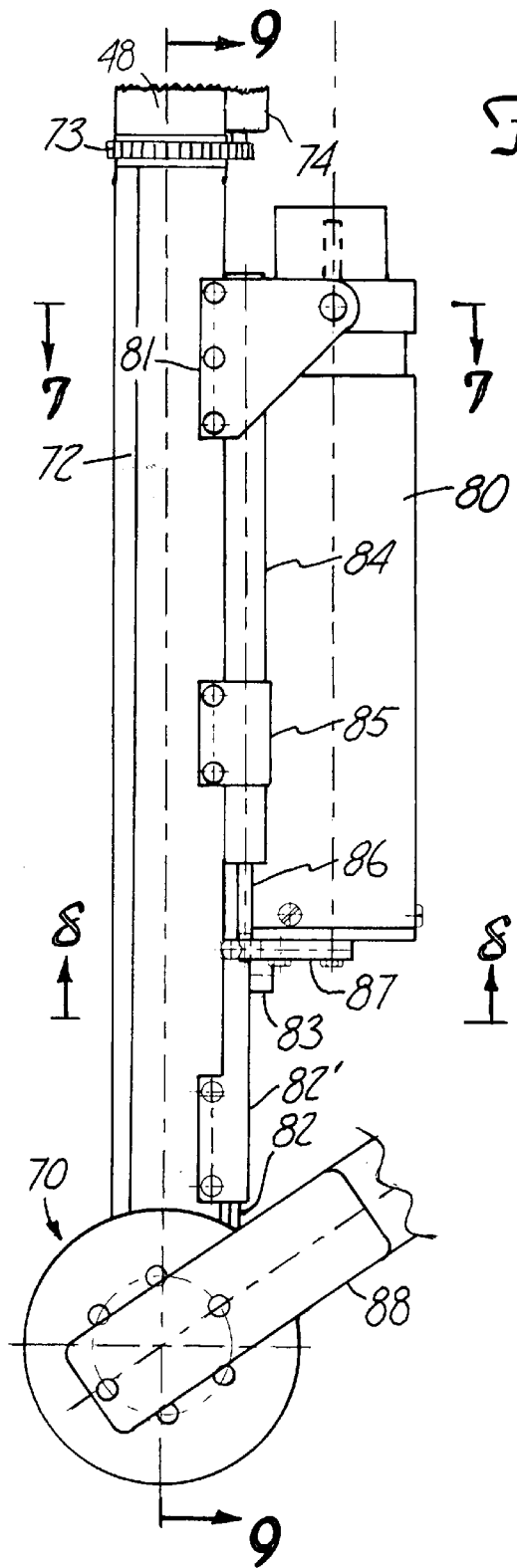
FIG. 6 shows an elevational view of a portion of the structure shown in FIG. 2.
Figure 8:
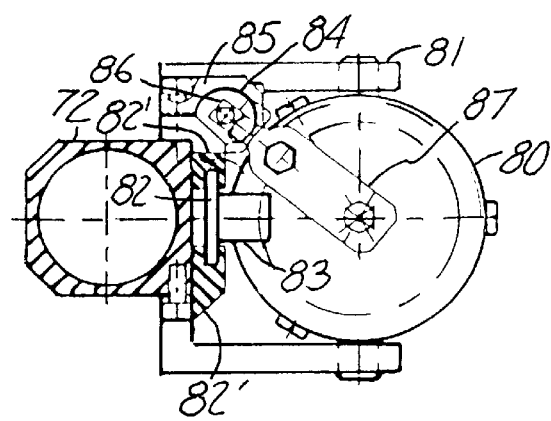
FIG. 8 shows a cross section view of the structure shown in FIG. 6.
Figure 7:
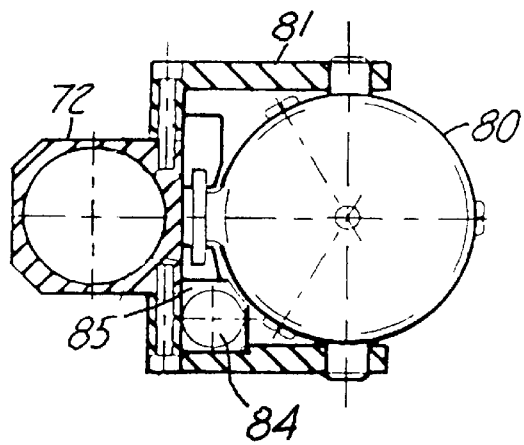
FIG. 7 shows a cross section view of the structure shown in FIG. 6.

FIG. 6 shows more detail in a selected one of joints 70 and 71, here joint 70. As can be seen, a linear actuator, 80, is used to force the side of joint 70 opposite tubular joint base 72 into motions relative to that base. Linear actuator 80 is rotatably connected at one end thereof to a bracket, 81, which is mounted on tubular joint base 72 as can be more easily seen in the cross section view of FIG. 7. The opposite end of linear actuator 80 is connected to a flexible mechanical drive tape, 82, guided in a pair of tape guides, 82', by a tape connector, 83, mounted on that end of actuator 80 which can be better seen in the cross section view of FIG. 8. A linear variable differential transformer, 84, is held by a bracket, 85, to tubular joint base 72, and has its movable core, 86, connected by a connector, 87, to the same end of actuator 80 as is tape 82.

A tubular joint extension, 88, shown in FIG. 6 is subject to being rotated both clockwise and counterclockwise in the view of that figure about a end portion of tubular joint base 72 opposite that end thereof engaged with tubular ball extension 48 in accord with the single degree-of-freedom permitted joint 70. The bearing arrangement to allow such rotation of joint extension 88 is best seen in FIG. 9 where it can be seen that tubular joint base 72 expands at the rotational axis location of joint 70 to form on one side thereof a cup-like portion 89 (in which there is provided a removable plate to permit external access) supporting a portion of and enclosing, except for a side facing away from the rest of the cup, a circular bearing holder band, 90, with an open interior space. A pair of thin section angular contact bearings, 91, are fitted within the circular open interior space provided by bearing position band 90 on opposite sides of that band with the bearing outer races connected to the inner surface of this band.

Joint extension 88 also expands in the portion thereof at the rotational axis of joint 70 by forming a rectangular space a rectangular offset tub, 92, which has extending from the wall thereof farthest from the remainder of extension 88 within the rectangular space a truncated cylindrical shell, 93. Truncated cylindrical shell 93 has an outer diameter to permit it to fit within the circular open interior space of bearing holder band 90 of tubular joint base 72, and within bearings 91, so that the inner race of these bearings is connected to the outer surface of truncated cylindrical shell 93 so as to enable this shell to rotate within bearing holder band 90.

Joint extension 88 is driven in and out of the plane of FIG. 9 by mechanical drive tape 82 being fastened about the outer surface of truncated cylindrical shell 93 of that extension between the pair of bearings 91 to thereby be subject to being rotationally moved by movements of linear actuator 80 forcing that tape to correspondingly move. Mechanical drive tape 82 is fastened to the outer surface of truncated cylindrical shell 93 by pin, 94, seen in the cross section view of FIG. 10. There, mechanical drive tape 82 can be seen to pass through a slot in cup-like portion 89 of tubular joint base 72 to be wrapped around and pinned to the outer surface of truncated cylinder 93.

Thus, movement of linear actuator 80 in FIG. 10, thereby forcing upward the end of tape 82 connected to it, will lead to clockwise motion of joint extension 88, and downward motion of linear actuator 80 will lead to counterclockwise motion of joint extension 88. This is possible because mechanical drive tape 82 is a rugged but flexible polymer material designed for such service and sold under the trademark DYMETROL®. An advantageous result of using such a mechanical tape drive to transmit movement force to joint extension 88 from linear actuator 80 is the providing of an open passageway through the interior of the tubular joint base 72, through it's cup-like region 89, and then through truncated cylinder 93 and rectangular offset portion 92 of joint extension 88. This again is allows wiring to be passed therethrough and on to further locations in the apparatus of slave robot 10 beyond joint 70.

Single degree-of-freedom elbow-like joint 71 also has a tubular joint extension, 95, shown in FIG. 2 that is subject to be rotated upward and downward in that figure with respect to extension 49. Extending from each of joint extensions 88 and 95 are the remainder of the structures of slave robot 10 which are used to simulate the human forearm, the human wrist and the human hand. The human forearm is simulated by joint tubular base, 96, supported by tubular joint extension 88 with joint base 96 being rotatably attached to joint extension 88 through a pair of bearings having inner races attached to tubular joint base 96 and outer races attached to tubular joint extension 88 which cannot be seen in the drawings. The bottom of joint extension 88 has therearound a set of gear teeth, 97. A motor, 98, affixed to tubular joint extension 88 forces tubular joint base 96 to rotate within extension 88 in the bearings just described through a gear on the output shaft of that motor engaged with gear 97.

Similarly, joint extension 95 supports a joint tubular base, 99, simulating a human forearm rotatably attached thereto through a pair of bearings having inner races attached to tubular base 99 and outer races attached to extension 95 which cannot be seen in the drawings. The bottom of extension 95 has there around a set gear teeth, 100. A motor, 101, affixed to tubular joint extension 95 forces tubular joint base 99 to rotate within extension 95 in the bearings just described through a gear on the output shaft of the motor engaged with gear 100.

Further in FIG. 2, joint tubular base 96 supports a wrist-like joint, 102, and joint tubular base 99 supports a wrist-like joint, 103. Wrist-like joint 102 supports a hand-like structure, 104, and wrist-like joint 103 supports a hand-like structure, 105.

Figure 11:
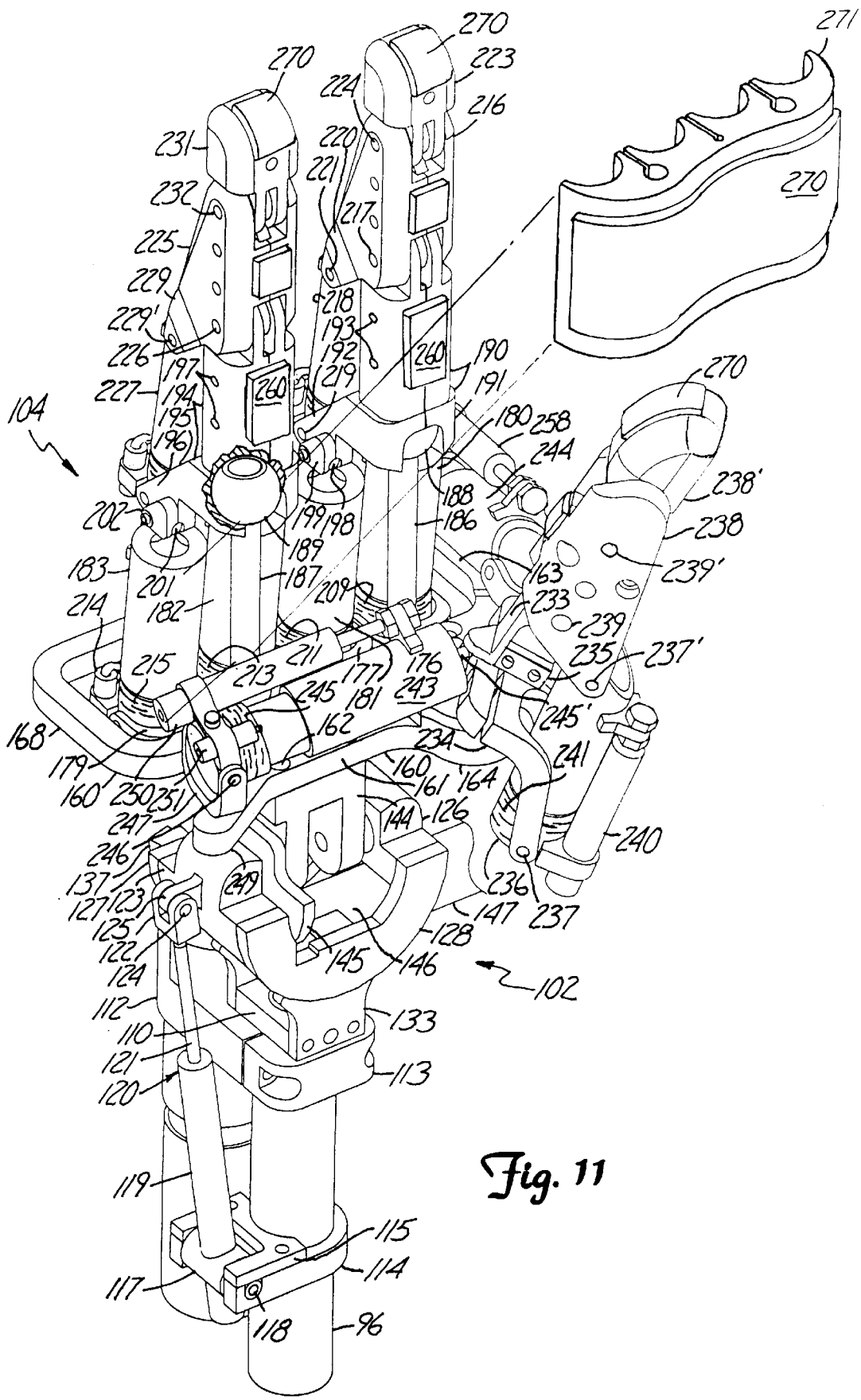
FIG. 11 shows a pictorial view of a portion of the structure shown in FIG. 2.
Figure 12:
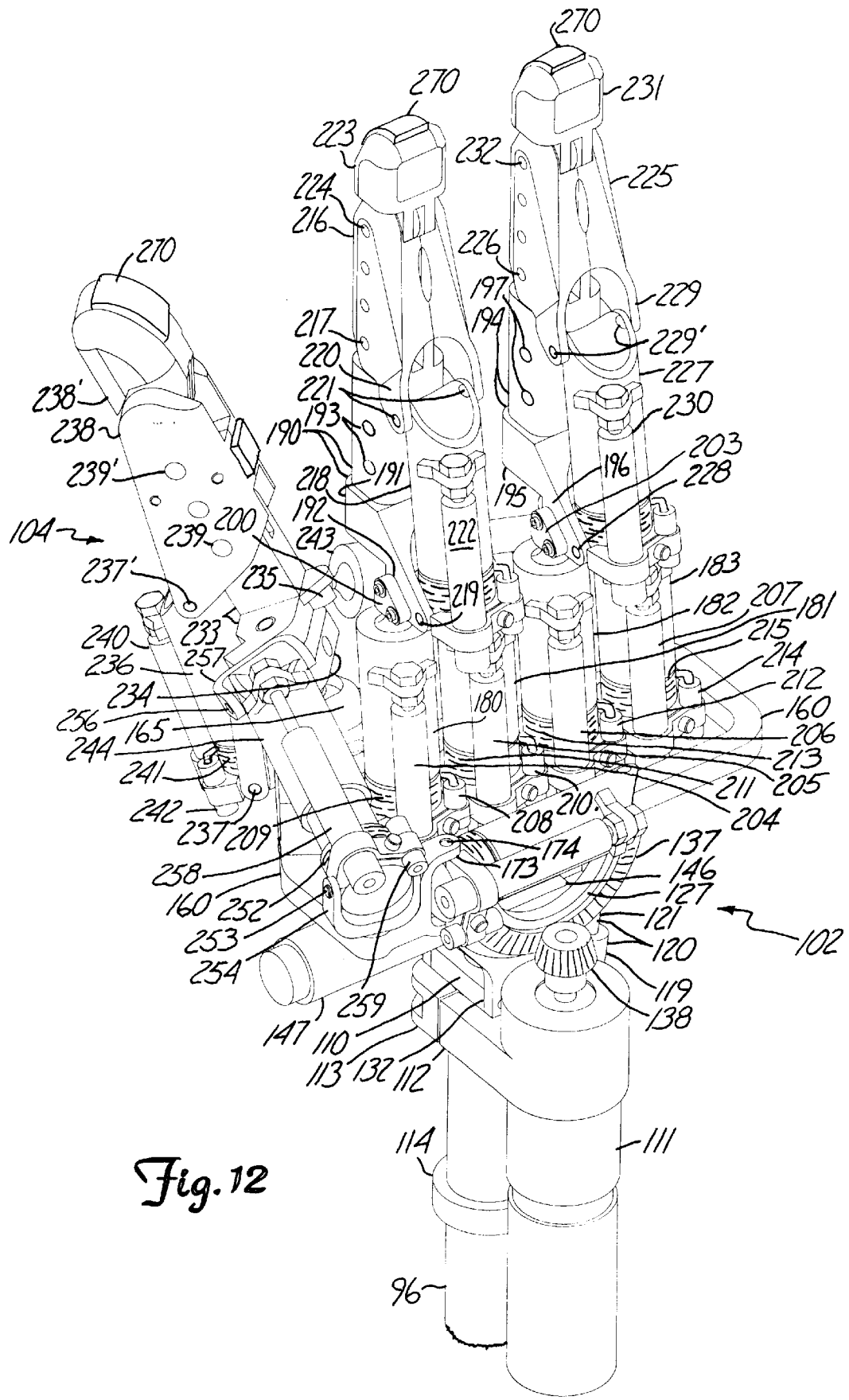
FIG. 12 shows an alternative pictorial view of the structure shown in FIG. 11.

Hand-like structure 105 is shown in greater detail in a front pictorial view thereof in FIG. 11, and in a rear pictorial view thereof in FIG. 12. As can be seen there, joint tubular base 96 in turn supports a pedestal and mounting block arrangement, 110, on which wrist-like joint 102 is mounted. Also supported on tubular base joint 96 is a drive motor, 111, clamped thereon by split clamp having a first clamp portion, 112, affixed to drive motor 111 and a separated second clamp portion, 113, which goes on the opposite side of joint tubular base 96 and a part of mounting block arrangement 110. When clamp portions 112 and 113 are brought together around portions of base 96 and arrangement 110 and clamped together by machine bolts (not shown) extending from one clamp portion to the other, motor 111 is firmly affixed to base 96 and arrangement 110.

Also affixed to joint tubular base 96 is a transducer bracket, 114, which has a circular opening therein to allow it to be slid over joint tubular base 96 against which it is tightened by a set screw not shown. Transducer bracket 114 has a spaced apart pair of arms extending therefrom with a valley in each covered by a clamping bracket, 115, to accept and rotatably hold in these valleys a solid pivot pin, 116, (seen only in FIG. 13 introduced below) extending from one side of a transducer holder, 117, and a center tapped pivot pin, 118, extending from the other side thereof. Pin 118 has a set screw therein which affixes holder 117 to the outer cylindrical shell body, 119, of a linear variable differential transformer, 120, positioned in a hole provided through holder 117 at right angles to the axis of the pins therein. An internal shaft, 121, of transducer 120 is affixed at the other end thereof in a yolk, 122. Yolk 122 is rotatably attached to a drive housing framing block, 123, by a pivot pin, 124, extending through the two sides of yolk 122 and an extension boss, 125, of framing block 123 which boss is positioned between those sides. Linear variable differential transformer 120 serves as a displacement measure transducer to indicate effectively the angular displacement of a drive housing that includes framing block 123 due to actions of motor 111.

Figure 13:
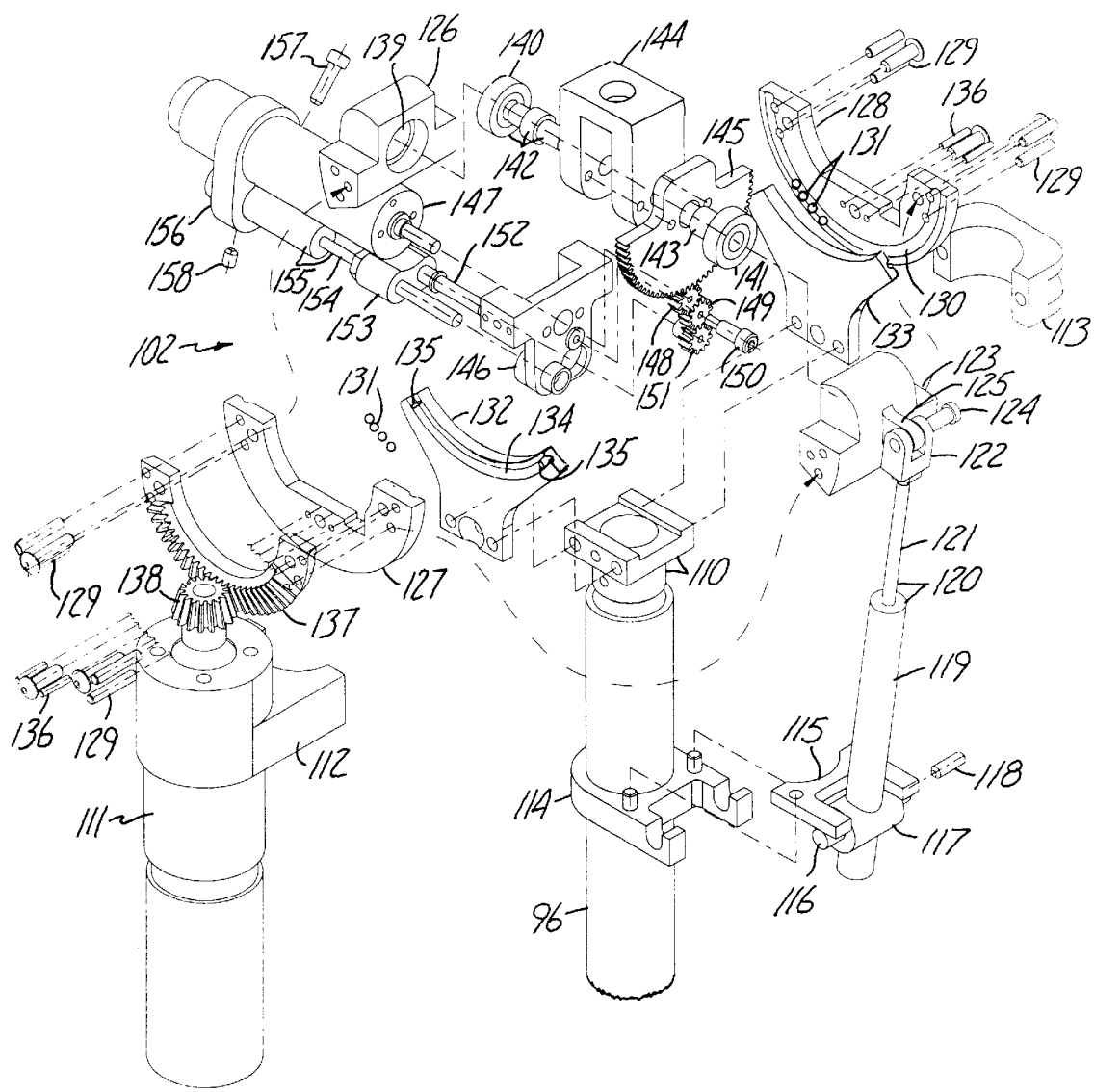
FIG. 13 shows an exploded pictorial view of a portion of the structure shown in FIGS. 11 and 12.

This drive housing is shown in an exploded view of wrist-like joint 102 in FIG. 13, and is there shown formed of a further drive housing framing block, 126, positioned in joint 102 opposite framing block 123, and two drive housing sectorial frames, 127 and 128, spaced apart but joined together by these two framing blocks. Drive housing framing blocks 123 and 126 are connected to drive housing sectorial frames 127 and 128 by machine screw and pin sets, 129. In each of drive housing sectorial frames 127 and 128 are provided bearing races, 130, in which ball bearings, 131, are positioned. Ball bearings 131 are held in bearing races 130 by drive housing sectorial mounts, 132 and 133. Mounts 132 and 133 each have bearing races, 134, in which ball bearings 131 are positioned as well as in races 130 of the corresponding one of drive housing sectorial frames 127 and 128 where they are held with these frames clamped against those mounts. Pins, 135, are provided at the opposite ends of the bearing races 134 to keep ball bearings 131 contained in races 130 and 134. Framing mounts 132 and 133 are affixed to mounting block 110 by a pair of machine screw and pin sets not shown.

In addition, drive housing sectorial frames 127 and 128 support a motor mount structure therebetween to be described below held thereto by a pair of machine screw and pin sets, 136. Drive housing sectorial frame 127 further has a sectorial bevel gear, 137, affixed thereto by machine screw and pin sets 129. Sectorial bevel gear 137 and drive housing sectorial frame 127 are driven together, and so also the drive housing, along the sectorial track of that bevel gear by a beveled pinon gear, 138, mounted on the output shaft of drive motor 111. Thus, the frame of the drive housing, formed of drive housing framing blocks 123 and 126 together with drive housing sectorial frames 127 and 128, is driven about an axis perpendicular to the axis joining two accommodational openings, 139, for ball bearing assemblies in drive housing framing blocks 123 and 126.

Each of ball bearing assembly accommodational openings 139 (only one of which is seen in FIG. 13) accommodate a corresponding preloaded ball bearing assembly, 140 and 141. The inner races of ball bearing assemblies 140 and 141 are press fitted on corresponding shafts, 142 and 143, each of which have a raised ring machined thereabout located at approximately the center thereof serving as spacers.

The opposite ends of shafts 142 and 143 are pressed fit into openings in a further output yolk, 144, serving as the joint 102 output structure supporting hand-like structure 104. Further affixed to one side of output yolk 144 is a sector gear, 145, through which shaft 143 passes into yolk 144. Sector gear 145 is affixed to the side of yolk 144 by machine screws not shown.

A drive housing motor support, 146, is, as previously mentioned, connected to drive housing sectorial frames 127 and 128 by machines screw and pin sets 136. Motor support 146 supports a further drive motor, 147, on an axis orthogonal to that about which the output shaft of drive motor 111 rotates. Drive motor 147 is mounted on motor support 146 by machine screws not shown extending through that mount into a flange on the face of drive motor 147. The output shaft of drive motor 147 extends through motor support 146 into a pinon gear, 148, engaged with sector gear 145 and which also drives an idler gear, 149, which is rotatably mounted on motor support 146 by a shoulder screw, 150. Idler gear 149, in turn, drives a further gear, 151, mounted on a threaded shaft, 152, which also extends through motor support 146. Rotation of gear 148 by motor 147 forces sector gear 145 and output yoke 144 to also rotate about the axis through shafts 142 and 143 so that hand-like structure 104 mounted on yoke 144 can be rotated to a desired angle by the combined motions provided by operating both motors 111 and 147.

Threaded shaft 152 extends into a threaded nut (not seen) in a translation carriage, 153. Thus, rotation of gear 148 by motor 147, and so rotation of gears 149 and 151, also causes threaded shaft 152 to rotate which in turn forces the nut in carriage 153 to move linearly along threaded shaft 152 thus translating rotation motion of gear 151 to linear motion of carriage 153. Carriage 153 is affixed to an output shaft, 154, belonging to a linear variable differential transformer, 155, used to measure the linear displacement of carriage 153 and thus the number of revolutions of drive motor 147 from a reference point. Hence, the angular displacement of output yoke 144 can be effectively measured. Linear variable differential transformer 155 is supported at its opposite end in a clamp, 156, placed around it and the base of drive motor 147. Clamp 156 is tightened by a machine screw, 157, and linear variable differential transformer 155 can be tighten in clamp 156 by use of a setscrew, 158.

Returning to FIGS. 11 and 12, hand-like structure 104 is supported on output yoke 144 by a slave support frame, 160, at a slave support base, 161, therein that is fastened to yoke 144 with machine screws, 162. Support frame 160 is better seen in FIG. 14 where a first extension, 163, extends from support base 161 to the right in that figure to thereafter curve around behind that base. A small subextension, 164, extends out from both base 161 and first extension 163 in a forward direction in that figure with a recess therein, not seen, that has a surface following a portion of a spherical surface. A frame cap plate, 165, with a recess therein having a surface also following a portion of a spherical surface, again not seen, is fastened to base 161, first extension 163, and subextension 164 to trap therebetween in the recesses a ball support, 166, having at least a portion of its surface following the surface of a portion of a sphere. Extending from ball support 166 is a tube support, 167, that passes through a second, opposite side access opening to the recess in frame cap plate 165 to be further described below. Tube support 167 and ball support 166 both have a common opening extending therethrough which meets another opening between frame cap plate 165 and both first extension 163 and subextension 164 to permit actuator and sensor wiring to extend from frame support 160 into that which is supported on tube support 167 to be described below.

Slave support frame 160 has a second extension, 168, rotatably connected to support base 161 by a shouldered sleeve, 169, fastened to base 161 by a machine screw, 170. Extension 168 extends to the left in FIG. 14 from its rotary connection to base 161 and then curves around behind that base to be rotatably connected to a linear actuator, 171, by a pivot pin, 172, passing through the opposite sides of the outer moveable body of actuator 171 and through a hole through the end of second extension 168 positioned between these two sides.

The opposite, or base, end of linear actuator 171 is rotatably connected in a yoke, 173, formed at the end of first extension 163 by a pivot pin, 174, passing through the two sides of yoke 173 and the base end of actuator 171. Thus, the outer moveable body of actuator 171, in being activated to travel back and forth with respect to the end thereof held in yoke 173 forces second extension 168 to rotate clockwise and counterclockwise with respect to support base 161. The degree of such rotation is measured by a linear differential variable transformer, 175, fastened to both the base end and the outer body of linear actuator 171 to measure the distance one has traveled with respect to the other. A machined spring is also formed at the base of linear actuator 171, and a linear variable differential transformer not seen is provided thereacross to measure the elongation or contraction of that spring to thereby measure the force on actuator 171.

Rotatably mounted to first extension 163 are a pair of clevises, 176 and 177, by sleeves and machine screws not shown. Similarly, rotatably mounted to second extension 168 are a pair of clevises, 178 and 179, again by sleeves and machine screws not shown. Each of these clevises in each of these pairs thereof has the base end of a corresponding linear actuator rotatably mounted therein, as can be seen in FIG. 11, by a corresponding pivot pin not seen. Thus, clevis 176 is rotatably connected to a corresponding linear actuator, 180. Similarly, clevis 177 is rotatably connected to a corresponding linear actuator, 181. In the remaining pair of clevises connected to second extension 168, clevis 178 is rotatably connected to a corresponding linear actuator, 182, and clevis 179 is rotatably connected to a corresponding linear actuator, 183.

Figure 14:
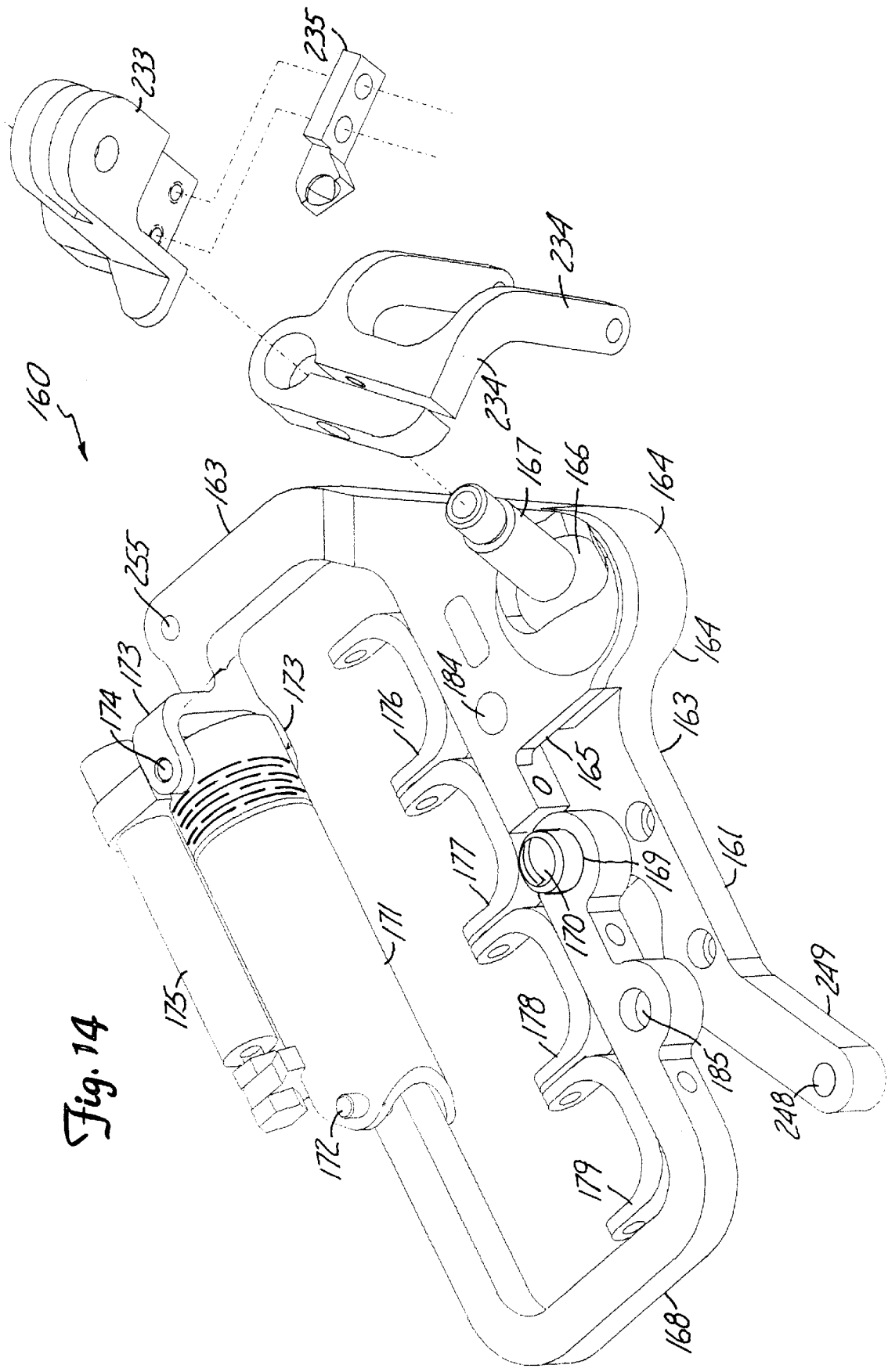
FIG. 14 shows a partially exploded pictorial view of a portion of the structure shown in FIGS. 11 and 12.

Two further support items are mounted in slave support frame 160 as assembled for use, one in an opening, 184, in frame cap plate 165 over first extension 163 and the other in an opening, 185, in second extension 168 as seen in FIG. 14. These support items are support ball pedestal tubes, there being a support pedestal, 186, fixedly mounted in opening 184 and another support pedestal, 187, fixedly mounted in opening 185 as seen in FIG. 11. Pedestal 186 supports a fixedly attached pedestal ball, 188, having at least a portion of its surface following the surface of a portion of a sphere. Similarly, pedestal 187 supports a fixedly attached pedestal ball, 189, also having at least a portion of its surface following the surface of a portion of a sphere. The pedestal and the ball in each of these pedestal and support ball combinations both have a common opening extending therethrough to permit actuator and sensor wiring to extend therethrough, as can be seen for pedestal ball 189 in FIG. 11 where the structure actually surrounding it has been partially broken away in that view to expose a portion of that pedestal ball.

Pedestal 186 and pedestal ball 188 support an effector base, 190, with a ball capture lip structure, 191, surrounding the bottom thereof to capture pedestal ball 188 therein as seen in FIG. 11. The opening in effector base 190 and ball capture lip structure 191 has an interior surface of which at least a portion follows a spherical surface to thereby allow effector base 190 and ball capture lip structure 191 to rotate around pedestal ball 188 in any direction, i.e. to be capable of rotating in orthogonal directions therearound. Ball capture lip structure 191 has two outward extensions on the rear side thereof to form a yoke, 192, seen in part in both FIGS. 11 and 12. Effector base 190, ball capture lip structure 191, and yoke 192 are formed from two half structures split along the length thereof, more or less vertically in FIGS. 11 and 12, which are brought together to capture pedestal ball 188 therebetween and are thereafter held together by a pair of machine screws, 193.

Similarly, pedestal 187 and pedestal ball 189 support another effector base, 194, with a ball capture lip structure, 195, surrounding the bottom thereof to capture pedestal ball 189 therein as again seen in FIG. 11. The opening in effector base 194 and ball capture lip structure 195 has an interior surface of which at least a portion follows a spherical surface to thereby allow effector base 194 and ball capture lip structure 195 to rotate around pedestal ball 189 in any direction, i.e. to be capable of rotating in orthogonal directions therearound. Ball capture lip structure 195 has two outward extensions on the rear side thereof to form a another yoke, 196, seen in part in both FIGS. 11 and 12. Here too, effector base 194, ball capture lip structure 195, and yoke 196 are formed from two half structures split along the length thereof, more or less vertically in FIGS. 11 and 12, which are brought together to capture pedestal ball 189 therebetween and are thereafter held together by a pair of machine screws, 197.

Effector base 190 is forced to rotate about pedestal ball 188 by linear actuators 180 and 181, the base ends of which are rotatably connected to first extension 163 on either side of pedestal 186 mounted in frame cap plate 165 at opening 184 through being rotatably connected by pivot pins to clevises 176 and 177, respectively, as described above. The opposite ends of actuators 180 and 181 have at the extremes thereof a ball on a base, or short pedestal, captured in a socket in the nearest arm of yoke 192 on either side of the opening in base effector 190 and ball capture lip structure 191 in which pedestal ball 188 is captured. Thus, actuator 181 has a ball, 198, on its outer body moveable end which is captured in an opening formed in the nearest arm of yoke 192 and a capture plate, 199, fastened thereto as seen in FIG. 11. This opening again has an interior surface at least a portion of which follows a portion of a spherical surface. The ball on the outer body moveable end of actuator 180 cannot be seen in FIG. 11, nor can it be seen in FIG. 12. However, a capture plate, 200, for capturing this unseen ball at this end of actuator 180 can be seen in the view in FIG. 12.

Linear actuators 180 and 181 are capable of forcing effector base 190 to any angle with respect to vertical within a limited angular range about the vertical in FIGS. 11 and 12 substantially followed by the length axis of effector base 190 in the straight-up position thereof in those figures. Extending or retracting the moveable ends of actuators 180 and 181 in unison forces effector base 190 forward and backward in the views of these figures with the combined forces supplied by each actuator, while differentials in the motions between the moveable ends of these actuators result in side-to-side motions of effector base 190. As a result, combinations of such motions allow choosing any desired angle for effector base 190 within the limited range. The angular range possible for effector base 190 is clearly limited mechanically by interference between ball capture lip structure 191 and pedestal 186, by the maximum excursion of the moveable ends of actuators 180 and 181 from the base ends thereof, and by the location of effector base 194 and the location of an opposing effector base not yet described. Practically, however, the angular range limits for effector base 190 will be established by operating controls on actuators 180 and 181 to limit the excursions of the moveable end thereof with respect to the corresponding end.

Similarly, effector base 194 is forced to rotate about pedestal ball 189 by linear actuators 182 and 183, the base ends of which are rotatably connected to second extension 168 on either side of pedestal 187 mounted in opening 185 in that extension through being rotatably connected by pivot pins to clevises 178 and 179, respectively, as described above. The opposite ends of actuators 182 and 183 also have at the extremes thereof a ball on a base, or short pedestal, captured in a socket in the nearest arm of yoke 196 on either side of the opening in base effector 194 and ball capture lip structure 195 in which pedestal ball 189 is captured. Thus, actuator 183 has a ball, 201, on its outer body moveable end which is captured in an opening formed in the nearest arm of yoke 192 and a capture plate, 202, fastened thereto as seen in FIG. 11. This opening again has an interior surface at least a portion of which follows a portion of a spherical surface. The ball on the outer body moveable end of actuator 182 cannot be seen in FIG. 11, nor can it be seen in FIG. 12. However, a capture plate, 203, for capturing this unseen ball at this end of actuator 182 can be seen in the view in FIG. 12.

In the same manner, linear actuators 182 and 183 are capable of forcing effector base 194 to any angle with respect to vertical within a limited angular range about the vertical in FIGS. 11 and 12 substantially followed by the length axis of effector base 194 in the straight up position thereof in those figures. Here again, extending or retracting the moveable ends of actuators 182 and 183 in unison forces effector base 194 forward and backward with the combined forces of each actuator in the views of these figures, while differentials in the motions between the moveable ends of these actuators result in side-to-side motions of effector base 194. Thus, combinations of such motions allow choosing any desired angle for effector base 194 within the limited range. The angular range possible for effector base 194 is limited in the same way as that for effector base 190.

The angular position achieved by either of effector bases 190 or 194 is measured in the manner that the angular position of second extension 168 in support frame 160 is determined, that is, by use of a linear variable differential transformer like transformer 175 measuring the extension of the moveable end of the corresponding linear actuators with respect to the base end thereof. Thus, in FIG. 12, linear actuator 180 has a linear variable differential transformer, 204, connected between its base and moveable ends; linear actuator 181 has a linear variable differential transformer, 205, connected between its base and moveable ends; linear actuator 182 has a linear variable differential transformer, 206, connected between its base and moveable ends; and linear actuator 183 has a linear variable differential transformer, 207, connected between its base and moveable ends.

The force appearing along the length axis of each of linear actuators 180, 181, 182 and 183 is also measured through the use of machined springs formed in a cylindrical block of material at the base ends of these actuators where this forming is accomplished by sawing slits into the cylindrical block. The remaining material forms a high spring constant spring with the deflection thereof being a measure of the applied force. That deflection is measured by a further linear variable differential transformer mounted across the ends of the machined springs in these actuators. Again in FIG. 12, linear actuator 180 has a linear variable differential transformer, 208, connected across the ends of its machined spring, 209, formed at its base end; linear actuator 181 has a linear variable differential transformer, 210, connected across the ends of its machined spring, 211, formed at its base end; linear actuator 182 has a linear variable differential transformer, 212, connected across the ends of its machined spring, 213, formed at its base end; and linear actuator 183 has a linear variable differential transformer, 214, connected across the ends of its machined spring, 215, formed at its base end.

Effector base 190 has a first gripping extension, 216, rotatably connected thereto at the end thereof opposite that in which pedestal ball 188 is captured as seen in FIGS. 11 and 12. Extension 216 has a yoke like end with two extensions between which a portion of effector base 190 is held by a pivot pin, 217, extending therethrough. A linear actuator, 218, has a base end thereof rotatably connected by a pivot pin, 219, between the extensions of yoke 192. The moveable end of actuator 218 is rotatably connected between a pair of extensions forming a yoke, 220, in first gripping extension 216 by a pair of pivot pins, 221. Extensions and retractions of linear actuator 218 forces first gripping extension 216 to rotate forward and backward about pins 221 with respect to effector base 190. A linear variable differential transformer, 222, again measures the displacement between the base and moveable ends of actuator 218 to measure the degree of this rotation.

A second gripping extension, 223, has a portion thereof rotatably connected to first gripping extension 216 between portions thereof forming a further yoke by a pin, 224, at its end opposite the end having a yoke connected to effector base 216. This gear is engaged with gears not seen in first gripping extension 216 forcing second gripping extension 223 to rotate with respect to first gripping extension 216 when the latter is rotated with respect to effector base 190.

Similarly for effector base 194, that base has a first gripping extension, 225, rotatably connected thereto at the end thereof opposite that in which pedestal ball 189 is captured as seen in FIGS. 11 and 12. Extension 225 has a yoke like end with two extensions between which a portion of effector base 194 is held by a pivot pin, 226, extending therethrough. A linear actuator, 227, has a base end thereof rotatably connected by a pivot pin, 228, between the extensions of yoke 196. The moveable end of actuator 227 is rotatably connected between a pair of extensions forming a yoke, 229, in first gripping extension 225 by a pair of pivot pins, 229'. Extensions and retractions of linear actuator 227 forces first gripping extension 225 to rotate forward and backward about pins 229' with respect to effector base 194. A linear variable differential transformer, 230, again measures the displacement between the base and moveable ends of actuator 227 to measure the degree of this rotation.

A second gripping extension, 231, has a portion thereof rotatably connected to first gripping extension 225 between portions thereof forming a further yoke by a pin, 232, at its end opposite the end having a yoke connected to effector base 225. Pin 232 also has a gear centrally mounted thereon. This gear is engaged with gears not seen in first gripping extension 225 forcing second gripping extension 231 to rotate with respect to first gripping extension 225 when the latter is rotated with respect to effector base 194.

An opposed effector subbase, 233, is mounted on a narrowed, upper portion of tube support 167 in FIG. 14 over a carrier bracket, 234, clamped to a wider, lower portion of that support by a set screw not shown. A socket former, 235, is attached to opposed effector subbase 233 by machine screws not shown. Thus, opposed effector subbase 233, carrier bracket 234 and socket former 235 are all rotatable together on ball support 166 to the extent permitted by the access opening in frame cap plate 165 through which tube support 167 extends.

These components assembled appear in FIGS. 11 and 12 where carrier bracket 234 has the two extended sides thereof curving downward in those figures form a yoke in which the base end of a linear actuator, 236, is rotatably held by a pivot pin, 237, passing therethrough and through the sides forming the yoke. The moveable end of actuator 236 is also rotatably connected by a pivot pin, 237', in a yoke formed in an opposed gripping base, 238. Opposed gripping base 238 is rotatably connected to both an opposed gripping extension, 238', and to opposed effector subbase 233, this latter rotary connection made by a pivot pin, 239.

The rotatable connection of opposed gripping base 238 to opposed gripping extension 238' is made by a further pivot pin, 239'. Pin 239' also has a gear centrally mounted thereon. This gear is engaged with gears not seen in opposed gripping base 238 forcing opposed gripping extension 238' to rotate with respect to opposed gripping base 238 when the latter is rotated with respect to opposed effector subbase 233. Linear actuator 236 forces opposed gripping base 238 to rotate with respect to opposed effector subbase 233, and the extent of this rotation is again measured by the displacement between the base and moving ends of this actuator. This displacement measurement is made by a linear variable differential transformer, 240. Force on this actuator is measured by use of a machined spring, 241, in the base end thereof with its displacement measured by a further linear variable differential transformer, 242.

Circumferential motion of opposed effector subbase 233 on tube support 167 and ball support 166 with respect to first extension 163 and subextension 164 to simulate such motion of the human thumb is provided by two further linear actuators, 243 and 244, which extend and retract at approximately right angles to one another to provide such motion. Actuator 243 has a machined spring, 245, in the base thereof and a short pedestal, 245', supporting a ball not seen on the moveable end thereof. Actuator 243 has this base end thereof rotatably connected by a pivot pin, 246, in a clevis, 247, which is rotatably connected in an opening, 248, in a support extension, 249, of frame support 160 seen in FIG. 14. The moveable end of actuator 243 has the unseen ball at its extreme on short pedestal 245' captured in the opening provided by opposed effector subbase 233 and socket former 235. This opening has an interior surface of which at least part follows a portion of a spherical surface to allow the ball captured to rotate therein. A linear variable differential transformer, 250, measures translation between the base and moveable ends of actuator 243, and a further linear variable differential transformer, 251, measures the elongation and compaction of machined spring 245.

Linear actuator 244 has a machined spring, 252, in the base thereof and has this base end rotatably connected by a pivot pin, 253, in a clevis, 254, which is rotatably connected in an opening, 255, in first frame extension 163 of frame support 160 seen in FIG. 14. The moveable end of actuator 244 is rotatably connected by a pivot pin, 256, in a clevis, 257, which is rotatably connected into opposed effector subbase 233. A linear variable differential transformer, 258, measures translation between the base and moveable ends of actuator 244, and a further linear variable differential transformer, 259, measures the elongation and compaction of machined spring 252.

Figure 15:
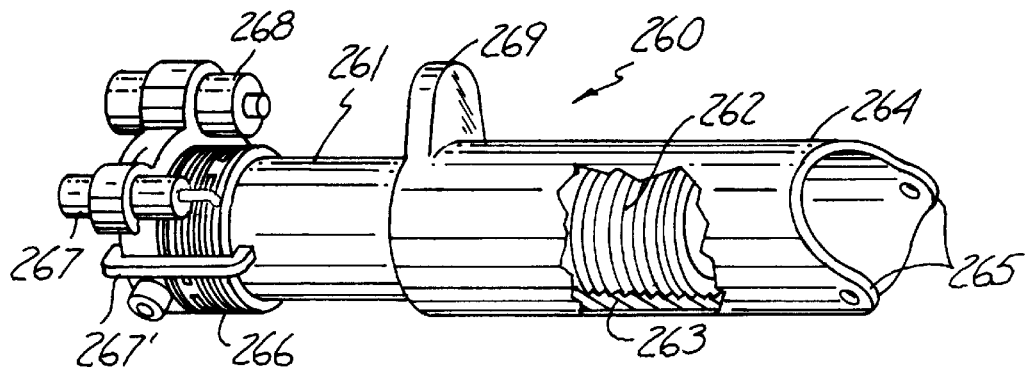
FIG. 15 shows a pictorial view of an alternative to a portion of the structure shown in FIGS. 11 and 12.

FIG. 15 shows a pictorial view of a linear actuator, 260, similar to those used in slave robot 10 described above and in control exoskeleton 12. A base, 261, contains an electrical motor to rotate a shaft mounting an exterior helical screw thread arrangement, 262, and a shaft encoder to provide electricals indicating these rotations. Shaft exterior screw thread arrangement 262 is engaged with an interior screw thread arrangement, 263, at the inner surface of a moveable cylindrical body or end, 264, of linear actuator 260. Moveable end 264 is shown formed with a yoke, 265, at the end thereof, but slave robot 10 also used such linear actuators having instead a ball on a pedestal at the extreme of the moveable end thereof.

A machined spring, 266, formed by sawing slits into a cylindrical metal block provided in base 261, provides a portion of a force measuring sensor through its elongating or compressing in proportion to the tensile or compression forces provided thereon, the resulting elongation or compression being measured by a linear variable differential transformer, 267, connected on opposite sides of spring 266 as part of the sensor. The elongation of spring 266 permitted is limited by a retainer, 267', also connected on opposite sides of that spring, to thereby prevent inelastic extensions thereof under sufficiently large tensile forces.

The translation of moveable end 264 with respect to base end of spring 261 has been typically measured by a further linear variable differential transformer having one end connected to each as has been shown for the linear actuators described above, but a cheaper though less accurate alternative is shown in FIG. 15 in the form of an electrical switch, 268, which is caused to switch between open and closed by a tab, 269, extending from the near end of moveable body 264, to set positional reference point for that body. Translation of body 264 from that point is then kept track of by the signals provided by the shaft encoder in base 261. A further alternative not shown is the use of a sliding wiper potentiometer connected to both base end 261 and moveable end 264 to measure translations therebetween.

Various force sensing pads, 270, are provided on the gripping surfaces of hand-like structure 104 as seen in FIG. 11, including over a cover cushion, 271, mountable on pedestals 186 and 187 for providing a smooth surface to grip objects against. The electrical wiring used to interconnect these pads with the transmitter in slave robot 10 in communication with system controller 15 is not shown. Pads 270 are typically formed by two sheets of closely spaced electrical conductors positioned to have the conductors in each sheet orthogonal to those in the other to in effect form a grid with each sheet of wiring separated form the other by a material which reduces its electrical conductivity with increasing force thereon. The locations in the grid with reduced electrical resistance between conductor cross over points can be determined to indicate the location and magnitude of the applied force which is conveyed to system controller 15.

As indicated above, bodily motion based force magnitude signals (and some translation magnitude signals) derived from signals generated in control exoskeleton 12 during its operation are used by control arrangement 13 to cause similar motions by the above described similar actuators in slave robot 10 through control arrangement 13 transmitting such signals to slave robot 10. Such signals generated in control exoskeleton 12 during its operation are generated by sensors located in the various portions of control exoskeleton 12 adjacent actuators used in those portions. Examples of portions of control exoskeleton 12 having such actuators along with appropriate sensors are provided by a pair of wrist-like joints, 280 and 281, supporting a pair of corresponding hand-like structures, 282 and 283. Control exoskeleton 12 receives signals from control arrangement 13 based on the signals control arrangement 13 received from the sensors in these portions and uses the information in those signals to operate the corresponding actuators in slave robot 10, and also in control exoskeleton 12 to aid human operator 11 in moving the exoskeleton apparatus to the extent desired by that operator. That is, the signals received in control exoskeleton 12 from control arrangement 13 are used to move the corresponding actuators therein sufficiently to null out force magnitude signals measured by force sensors thereon due to forces imposed by bodily motions of human operator 11 which force signals (and some translation magnitude signals) were transmitted to control arrangement 13.

Figure 16:
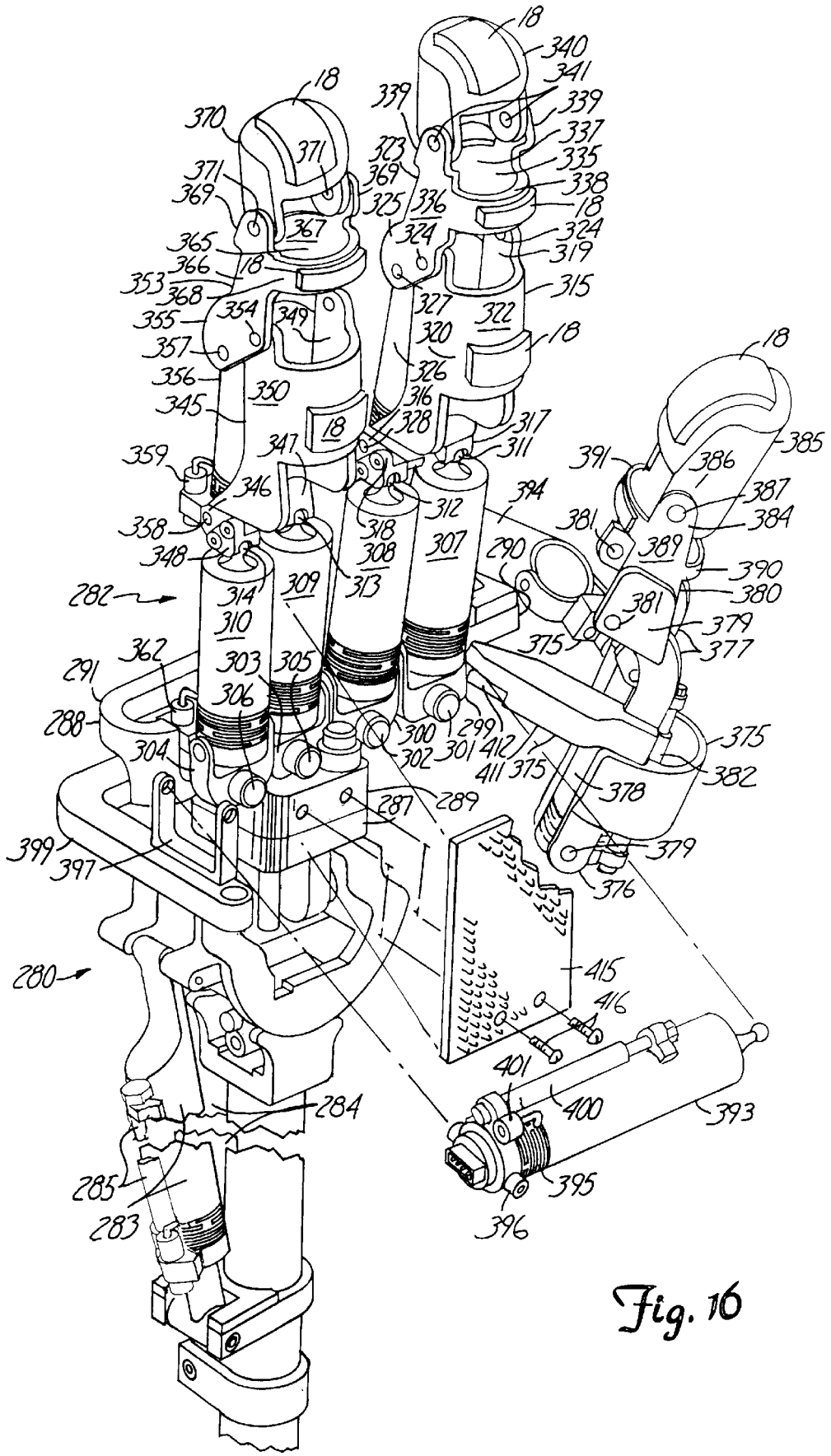
FIG. 16 shows a pictorial view of a portion of the structure shown in FIG. 2.

Wrist-like joint 280 and hand-like structure 282 are shown in more detail in a front pictorial view thereof in FIG. 16 and in a corresponding rear pictorial view in FIG. 17. Wrist-like joint 280 has essentially the construction of wrist-like joint 102 in FIGS. 11, 12 and 13 except for the force actuators used. The force actuators in wrist-like joint 280 are provided by a pair of linear actuators, 283 and 284, rather than by electrical motor 111 with pinion 138 and electrical motor 147 with pinion 148 driving corresponding sector gears 137 and 145 used in joint 102. Also, two linear variable differential transformers, 285 and 286, are used to provide a measure of the angular rotation of the drive housing through measuring the translation of the corresponding moving ends of linear actuators 283 and 284 with respect to the bases thereof. Only portions of linear variable differential transformers 285 and 286 can be seen in FIGS. 16 and 17. Linear variable differential transformer 285 corresponds to linear variable transformer 120 in FIGS. 11, 12 and 13 and linear variable differential transformer 286 is the substitute for linear variable differential transformer 155 in FIG. 13 used with translation carriage 153. Because of the otherwise similar construction and performance of wrist-like joints 102 and 280, no further description will be provided here of joint 280 other than that hand-like structure 282 is supported on an output yoke, 287, in wrist-like joint 280.

Hand-like structure 282 is supported on output yoke 287 by a master support frame, 288, at a master support base, 289, therein that is fastened to yoke 287 with machine screws not shown. Support frame 288 is better seen in FIG. 18 where a first extension, 290, extends from support base 289 to the right in that figure to thereafter curve around behind that base. Support frame 288 has a second extension, 291, rotatably connected to support base 289 by a shouldered sleeve, 292, fastened to base 289 by a machine screw, 293. Extension 291 extends to the left in FIG. 18 from its rotary connection to base 289 and then curves around behind that base to be rotatably connected to a linear actuator, 294, by a pivot pin, 295, passing through the opposite sides of a yoke at the extreme end of the outer movable body of actuator 294 and through a hole through the end of second extension 291 positioned between those two sides.

The opposite, or base, end of linear actuator 294 is rotatably connected in a yoke, 296, formed at the end of first extension 290 by a pivot pin, 297, passing through the two sides of yoke 296 and the base end of actuator 294. Thus, the outer movable body of actuator 294, in being activated to travel back and forth with respect to the end thereof held in yoke 296, forces second extension 291 to rotate clockwise and counterclockwise with respect to base support 289. The degree of such rotation is measured by a linear differential variable transformer, 298, fastened both to the base end and the outer body of linear actuator 294 to measure the distance one end has traveled with respect to the other. A machine spring is also formed at the base of linear actuator 294, and a linear variable differential transformer not seen is provided thereacross to measure the elongation or contraction of that spring to thereby measure the force on actuator 294.

Rotatably mounted to first extension 290 are a pair of clevises, 299 and 300, these being rotatably connected by a corresponding pair of sleeve and machine screw combinations, 301 and 302. Similarly, rotatably mounted to second extension 291 are a pair of clevises, 303 and 304, again so connected by a corresponding pair of sleeve and machine screw combinations, 305 and 306. Each of these clevises in each of these pairs thereof has the base end of a corresponding linear actuator rotatably mounted therein by a corresponding pivot pin as can be seen in FIG. 16. Thus, clevis 299 is rotatably connected to a corresponding linear actuator, 307. Similarly, clevis 300 is rotatably connected to a corresponding linear actuator, 308. In the remaining pair of clevises connected to second extension 291, clevis 303 is rotatably connected to a corresponding linear actuator, 309, and clevis 304 is rotatably connected to a corresponding linear actuator, 310.

Linear actuator 307 has provided at the extreme of the movable end thereof a ball, 311, supported on a short pedestal as seen in FIG. 16. Similarly, the extreme of the movable end of linear actuator 308 has provided thereat a further ball, 312, on a short pedestal. In much the same manner, linear actuator 309 has a ball, 313, supported on a short pedestal as the extreme of its movable end, as does linear actuator 310 in supporting a further ball, 314.

Linear actuators 307 and 308 together rotatably support a digit capture base, 315, at a yoke, 316, formed at the bottom thereof as seen in FIGS. 16 and 17. The arms of yoke 316 each have an opening therein having an interior surface of which at least a portion follows a spherical surface. Ball 311 is captured in one of these openings by a capture plate, 317, also having an opening therein following in part a spherical surface, such that digit capture base 315 can rotate about ball 311. Ball 312 is captured in the remaining opening in the other arm of yoke 316 by a further capture plate, 318, also having a opening with the portion following a spherical surface so that base 315 can rotate about ball 312 also.

The remainder of digit capture base 315 extending upward in FIGS. 16 and 17 from yoke 316 is formed much like a portion of a hollow tube-like structure with portions of the tube wall omitted. Thus, there are two sidewalls, 319 and 320, in digit capture base 315 extending upward in FIGS. 16 and 17 from yoke 316 with a back bridge, 321, joining sidewalls 319 and 320 just above yoke 316 as is best seen in FIG. 17. Further up digit capture base 315 is a front bridge, 322, also joining sidewalls 319 and 320 with front bridge 322 flaring outward from those sidewalls to provide room for a portion of the index finger or digit of operator 11 within digit capture base 315 during use.

At the end of digit capture base 315 opposite that end thereof formed with yoke 316 there is rotatably connected a digit capture first extension, 323, with this rotatable connection being accomplished by a pair of pivot pins, 324. Again, a yoke, 325, is formed toward the bottom of digit capture first extension 323 to which the movable end of a linear actuator, 326, is rotatably attached by a pair of pivot pins, 327. The base end of linear actuator 326 is fastened in yoke 316 of digit capture base 315 by a further pair of pivot pins, 328. Thus, linear actuator 326 is capable of causing digit capture first extension 323 to rotate with respect to digit capture base 315 about pivot pins 324. Linear actuator 326 has a machined spring at the base end thereof over which is connected a linear variable differential transformer, 329, to measure the elongation and contraction of that spring to determine the force on actuator 326 which is to be nulled out by control arrangement 13 in operating that actuator. In addition, a further linear variable differential transformer, 330, is connected between the base and moveable ends of actuator 326 to determine the translation of the moveable end with respect to the base as an indication of the amount of rotation of digit capture first extension 323 with respect to digit capture base 315 provided by the captured index digit of operator 11 and actuator 326 in nulling out the force provided by that index digit.

Linear actuators 307 and 308 also each have machined springs at the ends thereof for determining forces on these actuators while positioned at the back of the right hand of operator 11 during use. Here, though, such forces can arise because of motions of the index digit of operator 11 that are other than rotary motions about a single axis because digit capture base 315 is not merely rotatably connected to another solid structure by pivot pins but is instead connected to linear actuators 307 and 308 using ball-and-socket connections thereby permitting rotations of base 315 about an entire array of axes. Linear actuator 307 has a linear variable differential transformer, 331, connected over its base machined spring to determine the force thereon introduced by movements of the index digit of operator 11 during use. Similarly, linear actuator 308 has a linear variable differential transformer, 332, connected over its base machined spring to determine the force thereon during use. Here too, the forces on these actuators must be nulled out by control arrangement 13 operating the corresponding actuator, and these forces may be unequal because of side-to-side motions of the index digit of operator 11 during use.

A further linear variable differential transformer, 333, is connected between the base and moveable ends of linear actuator 307 to measure the translation between the ends thereof as an estimate of the rotation of digit capture base 315 about ball 311. In a like manner, another linear variable differential transformer, 334, is connected between the base and moveable ends of linear actuator 308 to measure the translation between the ends thereof as an estimate of the rotation of digit capture base 315 about ball 312.

Returning to digit capture first extension 323, this extension is also shaped as a tube-like structure with portions of the tube wall omitted. Thus, digit capture first extension 323 has a pair of sidewalls, 335 and 336, extending upward from yoke 325 with a back bridge, 337, joining sidewalls 335 and 336 together just above yoke 325. A front bridge, 338, also joins sidewalls 335 and 336 further up from yoke 325, and again flares outward from sidewalls 335 and 336 to provide room within digit capture first extension 323 for another portion of the index finger of operator 11 during use.

A further yoke, 339, located at the end of digit capture first extension 323 opposite the end with yoke 325, has a digit capture second extension, 340, rotatably connected to it by a pair of pivot pins, 341. Digit capture second extension 340 is formed similar to a thimble having the front portion of the thimble wall omitted. In view of no separate actuator having been provided to independently operate corresponding second gripping extension 223 in hand-like structure 104 in slave robot 10, which is instead operated with gearing actuated by linear actuator 218 to rotate with respect to first gripping extension 216, digit capture second extension 340 has been allowed to rotate freely with respect to digit capture first extension 323. In these circumstances of no independent force being applied to rotate second gripping extension 223, there is no need for an actuator to be connected between digit capture second extension 340 and digit capture first extension 323 to null out forces introduced by the extreme end section of the index finger or digit of the right hand of operator 11 in digit capture second extension 340 as the basis for generating a force magnitude signal to operate an actuator in slave robot 10 for supplying such independent force to second gripping extension 223.

In a manner similar to linear actuators 307 and 308, linear actuators 309 and 310 together rotatably support a digit capture base, 345, at a yoke, 346, formed at the bottom thereof again as seen in FIGS. 16 and 17. The arms of yoke 346 each have an opening therein having an interior surface of which at least a portion follows a spherical surface. Ball 313 is captured in one of these openings by a capture plate, 347, also having an opening therein following in part a spherical surface, such that digit capture base 345 can rotate about ball 313. Ball 314 is captured in the remaining opening in the other arm of yoke 346 by a further capture plate, 348, also having a opening with the portion following a spherical surface so that base 345 can rotate about ball 314 also.

Here too, the remainder of digit capture base 345 extending upward in FIGS. 16 and 17 from yoke 346 is formed much like a portion of a hollow tube-like structure with portions of the tube wall omitted. Thus, there are two sidewalls, 349 and 350, in digit capture base 345 extending upward in FIGS. 16 and 17 from yoke 346 with a back bridge, 351, joining sidewalls 349 and 350 just above yoke 346 as is best seen in FIG. 17. Further up digit capture base 345 is a front bridge, 352, also joining sidewalls 349 and 350 with front bridge 352 flaring outward from those sidewalls to provide room for a portion of the middle finger or digit of operator 11 within digit capture base 345 during use.

At the end of digit capture base 345 opposite that end thereof formed with yoke 346 there is rotatably connected a digit capture first extension, 353, with this rotatable connection being accomplished by a pair of pivot pins, 354. Again, a yoke, 355, is formed toward the bottom of digit capture first extension 353 to which the movable end of a linear actuator, 356, is rotatably attached by a pair of pivot pins, 357. The base end of linear actuator 356 is fastened in yoke 346 of digit capture base 345 by a further pair of pivot pins, 358. Thus, linear actuator 356 is capable of causing digit capture first extension 353 to rotate with respect to digit capture base 345 about pivot pins 354. Linear actuator 356 has a machined spring at the base end thereof over which is connected a linear variable differential transformer, 359, to measure the elongation and contraction of that spring to determine the force on actuator 356 which is to be nulled out by control arrangement 13 in operating that actuator. In addition, a further linear variable differential transformer, 360, is connected between the base and moveable ends of actuator 356 to determine the translation of the moveable end with respect to the base as an indication of the amount of rotation of digit capture first extension 353 with respect to digit capture base 345 provided by the captured middle digit of operator 11 and actuator 356 in nulling out the force provided by that middle digit.

Linear actuators 309 and 310 also each have machined springs at the ends thereof for determining forces on these actuators while positioned at the back of the right hand of operator 11 during use. Here, though, such forces can arise because of motions of the middle digit of operator 11 that are other than rotary motions about a single axis because digit capture base 345 is not merely rotatably connected to another solid structure by pivot pins but is instead connected to linear actuators 309 and 310 using ball-and-socket connections thereby permitting rotations of base 345 about an entire array of axes. Linear actuator 309 has a linear variable differential transformer, 361, connected over its base machined spring to determine the force thereon introduced by movements of the middle digit of operator 11 during use. Similarly, linear actuator 310 has a linear variable differential transformer, 362, connected over its base machined spring to determine the force thereon during use. Here too, the forces on these actuators must be nulled out by control arrangement 13 operating the corresponding actuator, and these forces may be unequal because of side-to-side motions of the middle digit of operator 11 during use.

A further linear variable differential transformer, 363, is connected between the base and moveable ends of linear actuator 309 to measure the translation between the ends thereof as an estimate of the rotation of digit capture base 345 about ball 313. In a like manner, another linear variable differential transformer, 364, is connected between the base and moveable ends of linear actuator 310 to measure the translation between the ends thereof as an estimate of the rotation of digit capture base 345 about ball 314.

Returning to digit capture first extension 353, this extension is again shaped as a tube-like structure with portions of the tube wall omitted. Thus, digit capture first extension 353 has a pair of sidewalls, 365 and 366, extending upward from yoke 355 with a back bridge, 367, joining sidewalls 365 and 366 together just above yoke 355. A front bridge, 368, also joins sidewalls 365 and 366 further up from yoke 355, and again flares outward from sidewalls 365 and 366 to provide room within base capture first extension 353 for another portion of the middle finger of operator 11 during use.

A further yoke, 369, at the end of digit capture first extension 353 opposite the end with yoke 355 has a digit capture second extension, 370, rotatably connected to it by a pair of pivot pins, 371. Digit capture second extension 370 is, like extension 340, formed similar to a thimble having the front portion of the thimble wall omitted. In view of no separate actuator having been provided to independently operate corresponding second gripping extension 231 in hand-like structure 104 in slave robot 10, which is instead operated with gearing actuated by linear actuator 227 to rotate with respect to first gripping extension 225, digit capture second extension 370 has been allowed to rotate freely with respect to digit capture first extension 353. Again, in these circumstances of no independent force being applied to rotate second gripping extension 231, there is no need for an actuator to be connected between digit capture second extension 370 and digit capture first extension 353 to null out forces introduced by the extreme end section of the middle finger or digit of the right hand of operator 11 in digit capture second extension 370 as the basis for generating a force magnitude signal to operate an actuator in slave robot 10 for supplying such independent force to second gripping extension 231.

An opposed digit capture bracket, 375, has a yoke, 376, formed at the lower end thereof in FIGS. 16 and 17, and a further yoke, 377, formed at the opposite, upper end thereof. A linear actuator, 378, is rotatably held by a pivot pin, 379, passing therethrough and through the sides of yoke 376. The movable end of actuator 378 is also rotatably connected by a further pivot pin unseen but used in a yoke, also unseen, that is formed as an inner yoke inside an outer yoke, 379, which is formed in an opposed digit capture base, 380, along with this unseen inner yoke. Opposed digit capture base 380 has its outer yoke 379 rotatably connected to yoke 377 of opposed digit capture base 375 by a pair of pivot pins, 381. Thus, linear actuator 378, positioned during use against the side of the right hand of operator 11 below the thumb, is operated by control arrangement 13 to null any force introduced thereon by the thumb of operator 11 in causing opposed digit capture base 380 to rotate with respect to opposed digit capture bracket 375. The extent of any such rotation is again estimated by the translation between the base and moving ends of actuator 378 as measured by a linear variable differential transformer, 382, connected therebetween. Any force introduced on this actuator is again measured by the use of a machined spring in the base end thereof with its elongation and contraction measured by a further linear variable differential transformer, 383, fastened to the base end of actuator 378.

Opposed digit capture base 380 has a further yoke, 384, formed at the opposite end thereof. An opposed digit capture extension, 385, has a yoke, 386, formed at the lower end thereof, and this yoke 386 is rotatably connected to yoke 384 of opposed digit capture base 380 by a further pair of pivot pins, 387. Outer yoke 379 at the lower end of opposed digit capture base 380, and the unseen inner yoke therein rotatably connected to the movable end of linear actuator 378, are formed on the lower ends of a pair of side walls, 388 and 389, which extend upward to form upper yoke 384 in that base. Thus, this base again is formed as a tube-like structure with portions of the tube wall omitted. A back bridge, 390, joins side walls 388 and 389 just above outer yoke 379. A front bridge, 391, joins side walls 388 and 389 further up base 380 closer to yoke 384.

Opposed digit capture extension 385 again is formed much like a thimble with a portion of the thimble wall omitted. Here too, since no separate actuator has been provided to independently operate corresponding opposed gripping extension 238' in hand-like structure 104 of slave robot 10 to rotate same with respect to first opposed gripping extension 238 (gearing actuated by linear actuator 236 being used instead), opposed digit capture extension 385 has been allowed to rotate freely with respect to opposed digit capture base 380. Since no independent force is being applied to rotate opposed gripping extension 238', there is no need for an actuator to be connected between opposed digit capture base 380 and opposed digit capture extension 385 to null out forces introduced by the extreme end section of the thumb of the right hand of operator 11 in opposed digit capture extension 385 as a basis for generating a force magnitude signal to operate an actuator in slave robot 10 for supplying such independent force to opposed gripping extension 238'.

Figure 18:
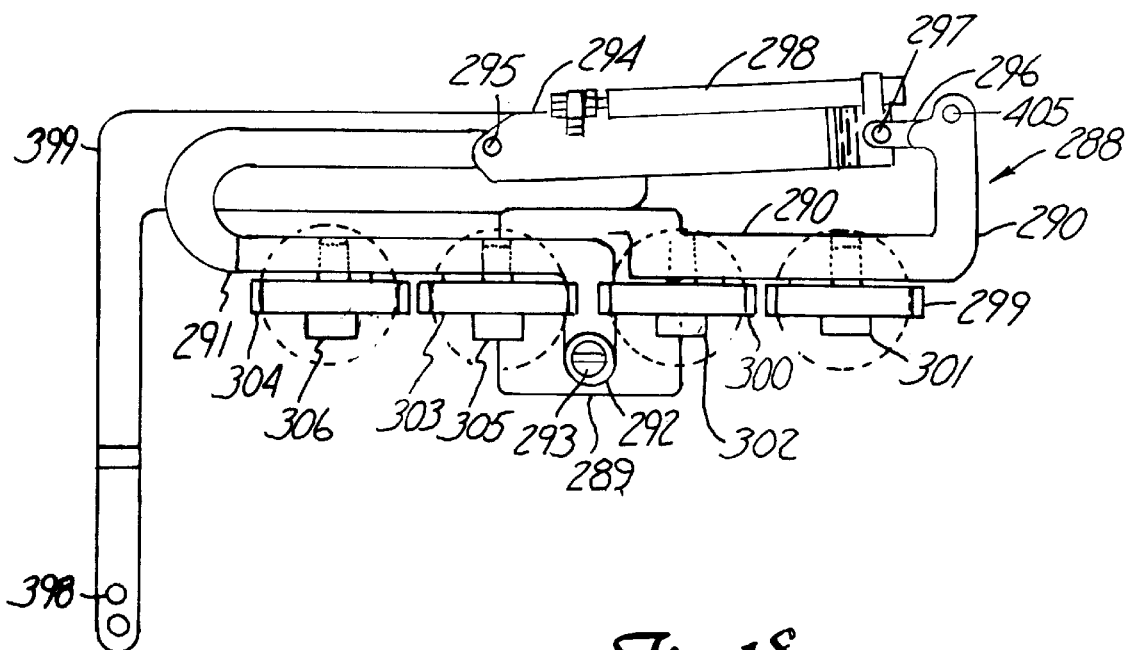
FIG. 18 shows a pictorial view of a portion of the structure shown in FIGS. 16 and 17.

Measuring the results of circumferential motion of the thumb of the right hand of operator 11 during use is provided for by two further linear actuators, 393 and 394, which extend and retract at approximately right angles to one another during use in nulling out the forces introduced thereon by the thumb of that operator. Actuator 393, shown exploded away from the rest of hand-like structure 282 in FIG. 16, has a machined spring, 395, in the base thereof and has this base end rotatably connected by a pivot pin, 396, in a clevis, 397, which is rotatably connected in an opening, 398, in a support bar, 399, in master frame 288 which is attached to support base 289 therein as seen in FIG. 18. The movable end of actuator 393 has a ball at its extreme end on a base, or short pedestal, which is captured in an opening provided in part by opposed digit capture bracket 375 to be described below. A linear variable differential transformer, 400, measures translation between the base and movable ends of actuator 393, and a further linear variable differential transformer, 401, measures elongation and compaction of machined spring 395.

Linear actuator 394, better seen in FIG. 17, has a machined spring, 402, in the base thereof and has this base end rotatably connected by a pivot pin, 403, in a clevis, 404, which is rotatably connected in an opening, 405, in first frame extension 290 of support frame 288 seen in FIG. 18. The movable end of actuator 394 is rotatably connected by a pivot pin, 406, in a clevis, 407, which is rotatably connected into a portion of opposed digit capture bracket 375 to be described below. A linear variable differential transformer, 408, measures translation between the base and movable ends of actuator 394, and a further linear variable differential transformer, 409, measures the elongation and compaction of machined spring 402.

Opposed digit capture bracket 375 has a first circumferential motion arm, 410, rigidly connected therein in which clevis 407 is rotatably connected. Bracket 375 also has a second circumferential motion arm, 411, rigidly connected therein on the opposite side thereof from arm 410, and arm 411 has an opening therein at its extreme end that has an interior surface of which at least a part follows a portion of a spherical surface to allow the ball on the short pedestal at the extreme of the movable end of linear actuator 393 to be captured and rotated therein by a capture plate, 412. Capture plate also has an opening therein with an interior surface at least a part of which follows a portion of the spherical surface.

Circumferential motions of the right thumb of operator 11 will lead to introducing forces on linear actuators 393 and 394 which will be sensed by the corresponding force sensors formed of machined spring 395 and linear variable differential transformer 401 for actuator 393, and of machined spring 402 which linear variable differential transformer 409 for actuators 394. These signals will be used by control arrangement 13 to provide operating signals to linear actuators 393 and 394 to null out the sensed forces thereon as a basis for generating signals by control arrangement 13 for operating linear actuators 243 and 244 in hand-like structure 104 of slave robot 10.

Figure 19:
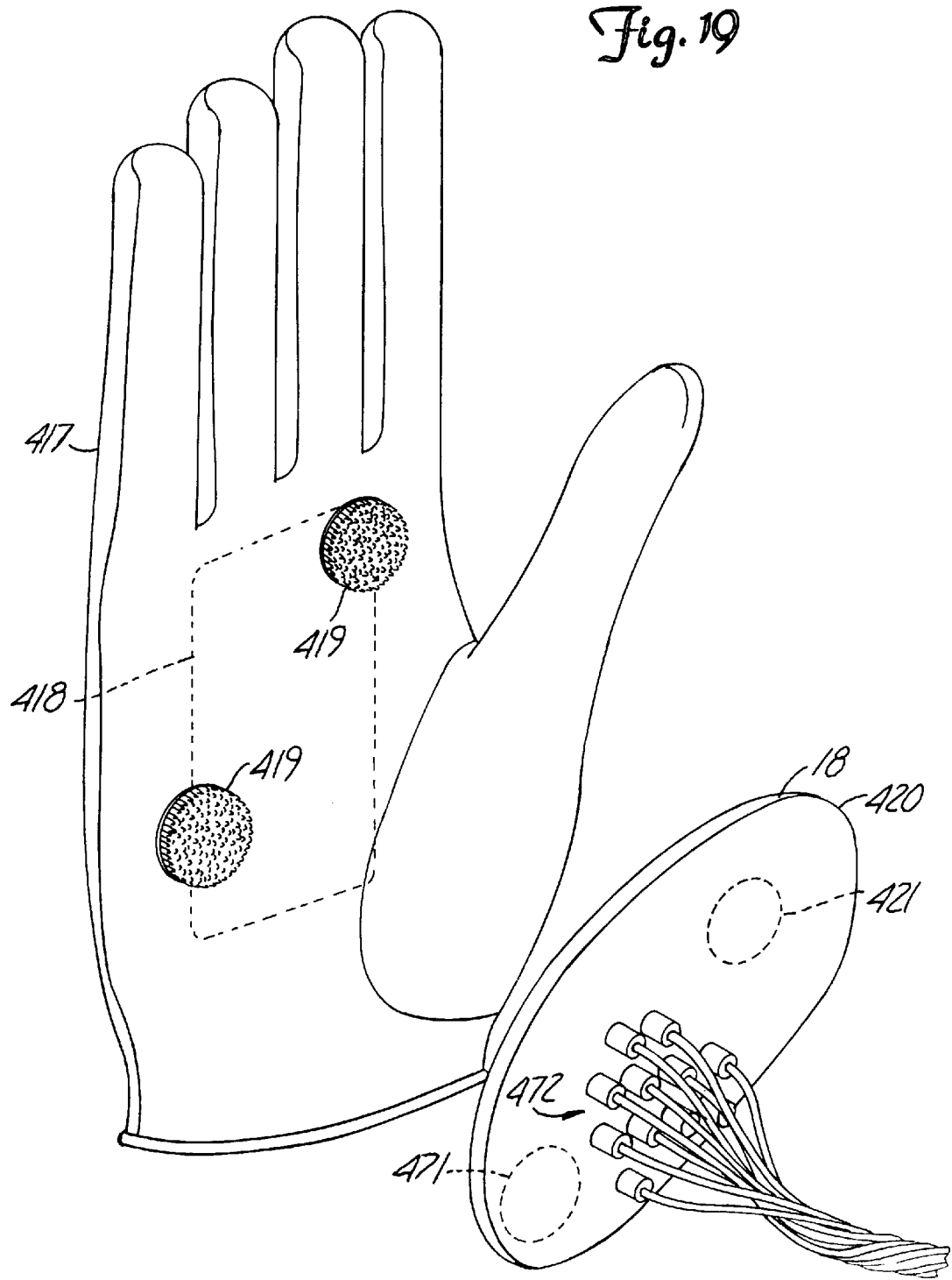
FIG. 19 shows a pictorial view of a portion of the structure shown in FIG. 2 used with the structure shown in FIGS. 16 and 17.

A support plate, 415, with a VELCRO® hook tape mounted thereon is affixed to master support base 289 of master support frame 288 by machine screws, 416, (but shown exploded away therefrom in FIG. 16). Operator 11 has his right hand during use inserted in a glove, 417, seen in FIG. 19. The back of glove 417 has a VELCRO® loop tape, 418, mounted thereon but shown only in dotted line form in FIG. 19. Thus, when operator 11 has his right hand inserted in glove 417 with 1) his thumb positioned in opposed digit capture base 380 and opposed digit capture extension 385, ii) his index finger positioned in digit capture base 315, digit capture first extension 323 and digit capture second extension 340, and iii) his middle finger positioned in digit capture base 345, digit capture first extension 353 and digit capture second extension 370, the VELCRO® hook tape mounted on support 415 will be removably fastened to VELCRO® loop tape 418 mounted on glove 417 to the right hand of operator 11 in this position in master hand-like structure 282.

Hence, motions of the thumb, index finger or middle finger of the right hand of operator 11 will cause similar motions of the corresponding mechanical apparatuses in which they are positioned in master hand-like structure 282, rather than these corresponding apparatuses being only partially moved due slippings of master hand-like structure 282 about the hand of operator 11 during such motions in the absence of such a back of the hand fastening arrangement. As a result of the good correlation between the motions of the thumb, index finger or middle finger of the right hand of operator 11 initiated by that operator and the resulting motions of the corresponding mechanical apparatuses in which they are positioned in master hand-like structure 282, the forces from these initiated motions leading to the mechanical apparatus motions will be fully nulled out by control arrangement 13 resulting in accurate signals being sent by control arrangement 13 to faithfully direct corresponding motions of corresponding apparatuses in slave hand-like structure 104.

Glove 417 has two further VELCRO® hook tapes portions, 419, provided thereon in the portion thereof covering the palm of the right hand of operator 11. Portions 419 are for removably fastening a tactile actuator mount, 420, to that palm portion of glove 417 at two corresponding VELCRO® loop tape portions, 421, on that mount seen only in dotted line form in FIG. 19. Mount 420 supports a group of electrical solenoid actuators, 422, protruding therethrough which are held against the palm portion of glove 417 with that mount fastened to that glove as described. Mount 420 along with actuators 422 form one of tactile force actuators 18 used for applying forces or pressure during operation to the palm of the right hand of operator 11 in proportion to the forces sensed by force sensing pads 270 on cover cushion 271 of hand-like structure 104 in such operation under the control of control arrangement 13.

Figure 20:
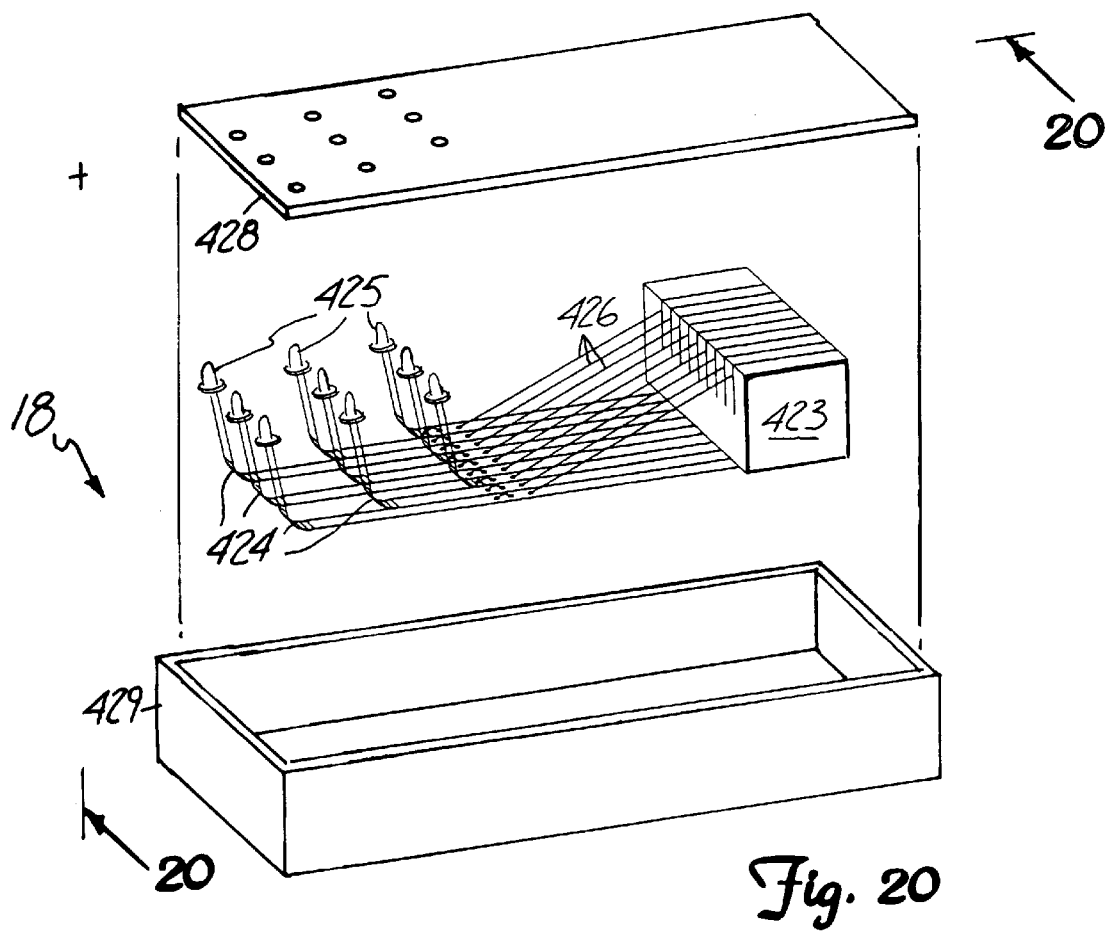
FIG. 20 shows a partially exploded pictorial view of a portion of the structure shown in FIGS. 16 and 17.

Others of tactile force actuators 18 seen in FIGS. 16 and 17 on the various bases and extensions shown there of hand-like structure 282 also apply forces or pressure to the portions of the right hand of operator 11 against which they are adjacent in proportion to the forces sensed on corresponding ones of sensing pads 270 of hand-like structure 104 also under the control of control arrangement 13. These tactile force actuators, however, rather than being electrically operated solenoids, are each a group of electrically operated hammers or forcing arms as seen in more detail in the partially exploded view of FIG. 20. There, a base block, 423, supports on its bottom the ends of nine resilient metal forcing arms, 424, which have the ends thereof opposite the supported ends turned upward at a ninety degree angle and covered with end caps, 425.

Figure 21:
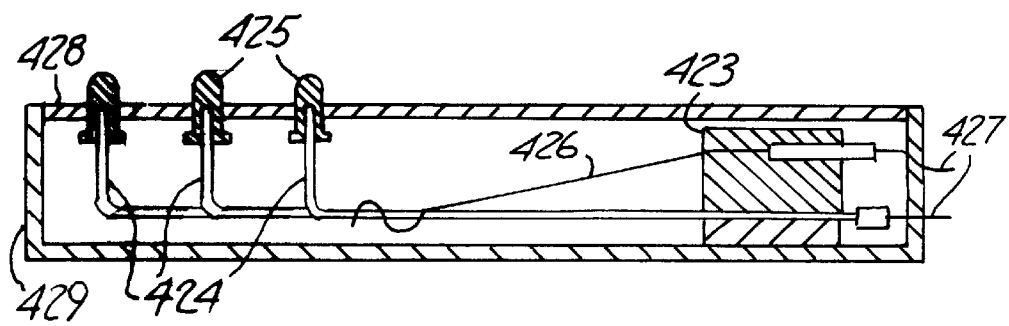
FIG. 21 shows a cross section view of a portion of the structure shown in FIG. 20.

Each of metal forcing arms 424 at a distance from block 423 has an actuator wire, 426, fastened thereto through it being woven through three openings provided in that arm at that location, the opposite ends of wires 426 being held in slots in the top of block 423. Wires 426 are each formed of a shape-memory alloy which contract proportionally to the heating thereof which is provided by supplying a corresponding electrical current therethrough. To this end, electrical lead wires, 427, are provided to block 423 to connect to the supported ends of forcing arms 424 and the ends of wires 426 embedded in the slots of block 423 as can be seen in the cross section view shown in FIG. 21.

A touchboard, 428, has holes therethrough to accommodate end caps 425 and is fastened to block 423. Contraction of wires 426 forces forcing arms 424 upward to force end caps 425 outward through the holes in touchboard 428 and against the adjacent portions of glove 417 and the corresponding portions of the right hand of operator 11. The outward extent reached by these end caps, and so the tactile force or pressure applied to operator 11, is set by control arrangement 13 based on the amount of force sensed by the corresponding sensing pad 270 in hand-like structure 104.

Touchboard 428 is, in turn, fastened to a housing, 429, for enclosing and protecting the actuator. Touchboard 428, case 429 and arms 424 can all be formed with appropriate curvature therein to accommodate having the glove facing surface thereof maintain the adjacent surface curvature therearound when mounted in openings in the curved surfaces of the various bases and extensions of hand-like structure 282.

Although the present invention has been described with reference to preferred embodiments, workers skilled in the art will recognize that changes may be made in form and detail without departing from the spirit and scope of the invention.

What is claimed is:

1. An articulated manipulating system for mounting on a base in a robotic manipulator and capable of engaging selected objects, said system comprising:

a support frame having a base support for mounting on said base with said base support having a first frame extension so as to extend therefrom in a first direction and a second frame extension rotatable connected to said base support and extending therefrom in a second direction at an angle to said first direction;

a first effector base rotatably connected to said first frame extension so as to be rotatable with respect thereto in plural different directions;

a second effector base rotatable connected to said second frame extension so as to be rotatable with respect thereto in plural different directions;

first pair of base linear actuators each having an end thereof rotatably connected to said first frame extension at corresponding extension connection locations thereon, and each having that opposite end thereof rotatably connected to said first effector base at corresponding effector connection locations thereon so that any substantial differentials in movement of these actuators cause corresponding substantial motions of said first effector base towards a corresponding one of said extension connection locations and so that substantial common movements of these actuators causes substantial motions of said first said effector toward or away from both of said extension connection locations; and a second pair of base linear actuators each having an end thereof rotatable connected to said second frame extension at corresponding extension connection locations thereon, and each having that opposite end thereof rotatably connected to said second effector base at corresponding effector connections locations thereon.

2. The apparatus of claim 1 wherein said first effector base is rotatably connected to said first frame extension by there being a first pedestal extending from said first frame extension in a direction at an angle with respect to said first direction and substantially away from said base arrangement and having a first partial spherical support mounted on said first pedestal having an outer surface substantially shaped at least in part as a portion of a spherical surface, said first effector base having a first capture opening at one end thereof with an interior surface substantially shaped at least in part as a portion of a spherical surface in which said first partial spherical support is positioned, said first pair of base linear actuators each having an end thereof rotatably connected to said first frame extension on either side of said first pedestal, and each having that opposite end thereof rotatably connected to said first effector base on opposite sides of said first capture opening.

3. The apparatus of claim 1 further comprising a first gripping extension rotatably connected to said first effector base and an extension linear actuator having one end thereof rotatably connected to said first effector base adjacent where said first frame extension is rotatably connected thereto, and that opposite end thereof rotatably connected to said first gripping extension adjacent to where said first gripping extension is rotatably connected to said first effector base.

4. The apparatus of claim 1 wherein said support frame has a subextension extending in a subextension direction at an angle to said first direction and said support frame has a support frame extension extending in a support direction at an angle to said first direction, and further comprising:

an opposed effector base rotatably connected to said subextension so as to be rotatable with respect thereto in orthogonal directions; and a pair of lateral linear actuators each having an end rotatably connected to said opposed effector base and one of said pair having that opposite end thereof rotatably connected to said support frame extension, and that one remaining having that opposite end thereof rotatably connected to said first frame extension.

5. An articulated manipulating system for mounting on a base in a robotic manipulator and capable of engaging selected objects, said system comprising:

a support frame having a base support with a first frame extension so as to extend therefrom in a first direction, a base arrangement for mounting on said base comprising an output effector affixed to said base support, said output effector being rotatably mounted in a drive housing, said drive housing having a pair of housing sectorial frames affixed thereto, each having a bearing race following a circular arc therein for holding corresponding ball bearings against a corresponding bearing race following a circular arc in a corresponding one of a pair of housing sectorial mounts affixed to a support standard to result in said drive housing being rotatably connected to said support standard;

a first effector base rotatably connected to said first frame extension so as to be rotatable with respect thereto in plural different directions; and a first pair of base linear actuators each having an end thereof rotatable connected to said first frame extension at corresponding extension connection locations thereon, and each having that opposite end thereof rotatably connected to said first effector base at corresponding effector connection locations thereon so that any substantial differentials in movement of these actuators cause corresponding substantial motions of said first effector base towards a corresponding one of said extension connection locations and so that substantial common movements of these actuators causes substantial motions of said first said effector toward or away from both of said extension connection locations.

6. The apparatus of claim 2 wherein each of said first effector base linear actuators has said end thereof rotatably connected to said first effector base so as to have said first effector base be rotatable with respect thereto in orthogonal directions.

7. The apparatus of claim 3 further comprising a second gripping extension rotatably connected to said first gripping extension at an end thereof opposite that to which said extension linear actuator is connected.

8. The apparatus of claim 1 wherein those ends of said first and second frame extensions away from said base support are directed sufficiently toward one another to permit connecting a relative motion linear actuator therebetween to permit causing said second frame extension to be rotated about said rotatable connection thereof to said base support.

9. The apparatus of claim 1 wherein said second effector base is rotatably connected to said second frame extension by there being a pedestal extending from said second frame extension in a direction at an angle with respect to said second direction and substantially away from said base arrangement and having a partial spherical support mounted on said pedestal having an outer surface substantially shaped as a portion of a spherical surface, said second effector base having a capture opening at one end thereof with an interior surface substantially shaped as at least a portion of a spherical surface in which said partial spherical support is positioned, said second pair of base linear actuators each having an end thereof rotatably connected to said second frame extension on either side of said pedestal, and each having that opposite end thereof rotatably connected to said second effector base on opposite sides of said capture opening.

10. The apparatus of claim 4 further comprising an opposed gripping extension rotatably connected to said opposed effector base and an opposed extension linear actuator having one end thereof rotatably connected to said opposed effector base adjacent where said subextension is rotatably connected thereto, and that opposite end thereof rotatably connected to said opposed gripping extension adjacent to where said opposed gripping extension is rotatably connected to said opposed base effector.

11. The apparatus of claim 5 wherein said output effector has a housed gear sector affixed thereto engaged with a housed drive gear on an output shaft of a housed drive motor supported in said drive housing, and with one of said pair of housing sectorial frames affixed to said drive housing having a housing drive gear sector affixed thereto which is engaged with a housing drive gear on an output shaft of a housing drive motor supported by said support tube.

12. The apparatus of claim 6 further comprising said first effector base linear actuators each having force sensors therein capable measuring forces thereon.

13. The apparatus of claim 6 further comprising said first effector base linear actuators each having relative translation sensors thereon capable measuring relative translations between ends thereof.

14. The apparatus of claim 1 wherein said first pair of base linear actuators are rotatably connected to said first effector base as aforesaid so as to be also on a further common side thereof.

15. The apparatus of claim 14 wherein said first pair of base linear actuators are rotatably connected to said first frame extension as aforesaid on either side of where said first effector base is rotatably connected thereto.

* * * * *

UNITED STATES PATENT AND TRADEMARK OFFICE
CERTIFICATE OF CORRECTION

PATENT NO. : 5,967,580
DATED : OCTOBER 19, 1999
INVENTOR(S) : MARK E. ROSHEIM

It is certified that error appears in the above-identified patent and that said Letters Patent is hereby corrected as shown below:

Col. 27, line 47, delete "rotatable", insert --rotatably--

Col. 27, line 53, delete "rotatable", insert --rotatably--

Signed and Sealed this

Twenty-fifth Day of July, 2000

Attest:

Q. TODD DICKINSON

Attesting Officer

Director of Patents and Trademarks